United States Patent
Tuttle

(10) Patent No.: US 7,570,151 B2
(45) Date of Patent: *Aug. 4, 2009

(54) SYSTEM AND METHOD FOR LOCATING INDIVIDUALS AND EQUIPMENT, AIRLINE RESERVATION SYSTEM, COMMUNICATION SYSTEM

(75) Inventor: John R. Tuttle, Boise, ID (US)

(73) Assignee: Keystone Technology Solutions, LLC, Boise, ID (US)

( * ) Notice: Subject to any disclaimer, the term of this patent is extended or adjusted under 35 U.S.C. 154(b) by 487 days.

This patent is subject to a terminal disclaimer.

(21) Appl. No.: 11/271,935

(22) Filed: Nov. 10, 2005

(65) Prior Publication Data

US 2006/0061453 A1 Mar. 23, 2006

Related U.S. Application Data

(63) Continuation of application No. 10/326,762, filed on Dec. 20, 2002, now Pat. No. 7,030,732, which is a continuation of application No. 09/628,876, filed on Jul. 26, 2000, now Pat. No. 6,509,829, which is a continuation of application No. 09/305,182, filed on May 3, 1999, now Pat. No. 6,127,917, which is a continuation of application No. 08/807,678, filed on Feb. 27, 1997, now Pat. No. 5,914,671.

(51) Int. Cl.
*H04Q 5/22* (2006.01)
*G01C 21/34* (2006.01)
*G08B 5/22* (2006.01)

(52) U.S. Cl. .............. 340/10.6; 340/825.49; 340/10.42; 340/825.28; 340/10.1; 705/6

(58) Field of Classification Search ................. 340/10.1, 340/10.6
See application file for complete search history.

(56) References Cited

U.S. PATENT DOCUMENTS 3,750,103 A 7/1973 Angus et al.

(Continued)

FOREIGN PATENT DOCUMENTS

CA 2282376 7/2002

(Continued)

OTHER PUBLICATIONS

Radio Frequency Identification Device (RFID) and Method of Manufacture, Including an Electrical Operating System and Method; S/N: 07/899,777; Jun. 17, 1992; Tuttle et al.; 39 pp.

(Continued)

*Primary Examiner*—Brian A Zimmerman
*Assistant Examiner*—Omer S Khan
(74) *Attorney, Agent, or Firm*—Greenberg Traurig, LLP

(57) ABSTRACT

A reservation system includes a database configured to store information identifying customers who have purchased tickets for an event, information about the scheduled time for the event, and information identifying customers who have arrived; a controller configured to operate on the database; and an interrogator in communication with the controller, and an antenna coupled to the interrogator, the interrogator being configured to send wireless commands requesting wireless responses from portable identification devices, the portable identification devices being configured to transmit identifying data in response to receiving a command, the interrogator having a predetermined communications range and being configured to communicate with portable identification devices within the predetermined communications range, the controller being configured to modify the database to indicate that one of the customers who purchased a ticket has arrived, responsive to the interrogator receiving a response from the portable identification device associated with that customer, which response includes identifying data for that customer.

56 Claims, 12 Drawing Sheets

U.S. PATENT DOCUMENTS

| | | | |
|---|---|---|---|
| 4,075,632 | A | 2/1978 | Baldwin et al. |
| 4,247,759 | A | 1/1981 | Yuris et al. |
| 4,449,186 | A | 5/1984 | Kelly et al. |
| 4,471,345 | A | 9/1984 | Barrett, Jr. |
| 4,926,182 | A | 5/1990 | Ohta et al. |
| 4,931,932 | A | 6/1990 | Dalnekoff et al. |
| 4,984,156 | A | 1/1991 | Mekata |
| 5,010,240 | A | 4/1991 | Sheldon |
| 5,051,565 | A | 9/1991 | Wolfram |
| 5,121,407 | A | 6/1992 | Partyka et al. |
| 5,151,692 | A | 9/1992 | Hirahara |
| 5,317,309 | A | 5/1994 | Vercellotti et al. |
| 5,365,551 | A | 11/1994 | Snodgrass et al. |
| 5,401,944 | A | 3/1995 | Bravman et al. |
| 5,406,263 | A | 4/1995 | Tuttle |
| 5,432,027 | A | 7/1995 | Tuttle et al. |
| 5,455,851 | A | 10/1995 | Chaco et al. |
| 5,494,495 | A | 2/1996 | Tuttle et al. |
| 5,497,140 | A | 3/1996 | Tuttle |
| 5,539,775 | A | 7/1996 | Tuttle |
| 5,568,512 | A | 10/1996 | Rotzoll |
| 5,594,786 | A | 1/1997 | Chaco et al. |
| 5,621,412 | A | 4/1997 | Sharpe et al. |
| 5,649,296 | A | 7/1997 | MacLellan et al. |
| 5,652,570 | A | 7/1997 | Lepkofker |
| 5,689,229 | A | 11/1997 | Chaco et al. |
| 5,790,946 | A | 8/1998 | Rotzoll |
| 5,842,118 | A | 11/1998 | Wood, Jr. |
| 5,914,671 | A | 6/1999 | Tuttle |
| 5,942,987 | A | 8/1999 | Heinrich et al. |
| 5,952,922 | A | 9/1999 | Shober |
| 5,988,510 | A | 11/1999 | Tuttle et al. |
| 6,127,917 | A | 10/2000 | Tuttle |
| 6,130,602 | A | 10/2000 | O'Toole et al. |
| 6,509,829 | B1 | 1/2003 | Tuttle |
| 7,030,732 | B2 | 4/2006 | Tuttle |
| 2007/0290848 | A1 | 12/2007 | Tuttle |
| 2007/0290849 | A1 | 12/2007 | Tuttle |
| 2007/0290879 | A1 | 12/2007 | Tuttle |

FOREIGN PATENT DOCUMENTS

| | | |
|---|---|---|
| EP | 1012793 | 4/2003 |
| FR | 2673743 | 3/1991 |
| JP | H4313181 | 3/1991 |
| JP | H7210713 | 10/1994 |
| JP | H8512158 | 12/1995 |
| JP | 2005510985 | 8/2000 |
| WO | 9302433 | 2/1993 |
| WO | WO 93/02433 | 2/1993 |
| WO | 9501617 | 1/1995 |
| WO | WO 95/01617 | 1/1995 |
| WO | 9838600 | 9/1998 |

OTHER PUBLICATIONS

Wake Up Device for a Communications System; S/N: 08/092,147; Jul. 15, 1993; Rotzoll, Robert R.; 32 pp.

Method of Forming Button-Type Batteries and a Button-Type Battery Insulating and Sealing Gasket; S/N: 08/348,543; Dec. 1, 1994; Tuttle, Mark E.; 39 pp.

PCT/US98/02559; mailed Jul. 6, 1998; PCT International Search Report; 2 pp.

PCT/US98/02559; mailed Feb. 26, 1999; PCT Written Opinion; 5 pp.

Tuttle, John, U.S. Appl. No. 08/806,158; "A System for Locating an Individual in a Facility", filed Feb. 25, 1997, now abandoned.

U.S. Appl. No. 08/806,158, filed Feb. 25, 1997, entitled "A System for Locating An Individual In a Facility," now abandoned (transaction history not available on PAIR).

USPTO Transaction History of U.S. Appl. No. 08/807,678, filed Feb. 27, 1997, entitled "System and Method for Locating Individuals and Equipment, Airline Reservation System, Communication System," now U.S. Patent No. 5,914,671.

USPTO Transaction History of U.S. Appl. No. 09/305,182, filed May 3, 1999, entitled "System and Method for Locating Individuals and Equipment, Airline Reservation System, Communication System," now U.S. Patent No. 6,127,917.

USPTO Transaction History of U.S. Appl. No. 09/628,876, filed Jul. 26, 2000, entitled "System and Method for Locating Individuals and Equipment, Airline Reservation System, Communication System," now U.S. Patent No. 6,509,829.

USPTO Transaction History of U.S. Appl. No. 10/326,762, filed Dec. 20, 2002, entitled "System and Method for Locating Individuals and Equipment, Airline Reservation System, Communication System," now U.S. Patent No. 7,030,732.

USPTO Transaction History of U.S. Appl. No. 11/845,701, filed Aug. 27, 2007, entitled "System and Method for Locating Individuals and Equipment, Airline Reservation System, Communication System."

USPTO Transaction History of U.S. Appl. No. 11/845,704, filed Aug. 27, 2007, entitled "System and Method for Locating Individuals and Equipment, Airline Reservation System, Communication System."

USPTO Transaction History of U.S. Appl. No. 11/845,706, filed Aug. 27, 2007, entitled "System and Method for Locating Individuals and Equipment, Airline Reservation System, Communication System."

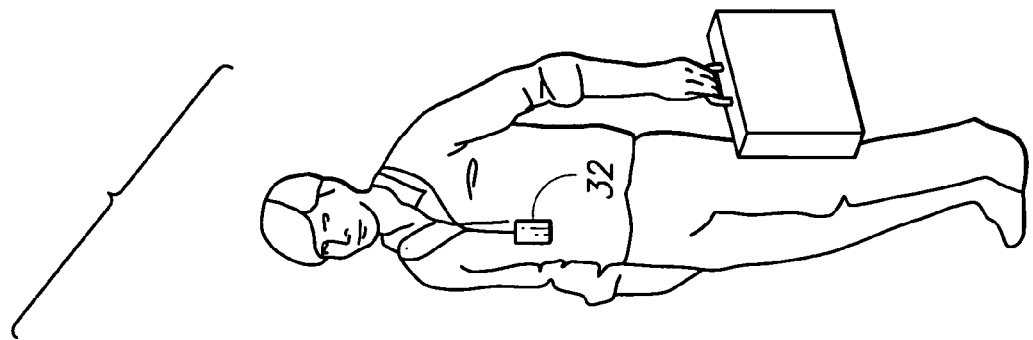
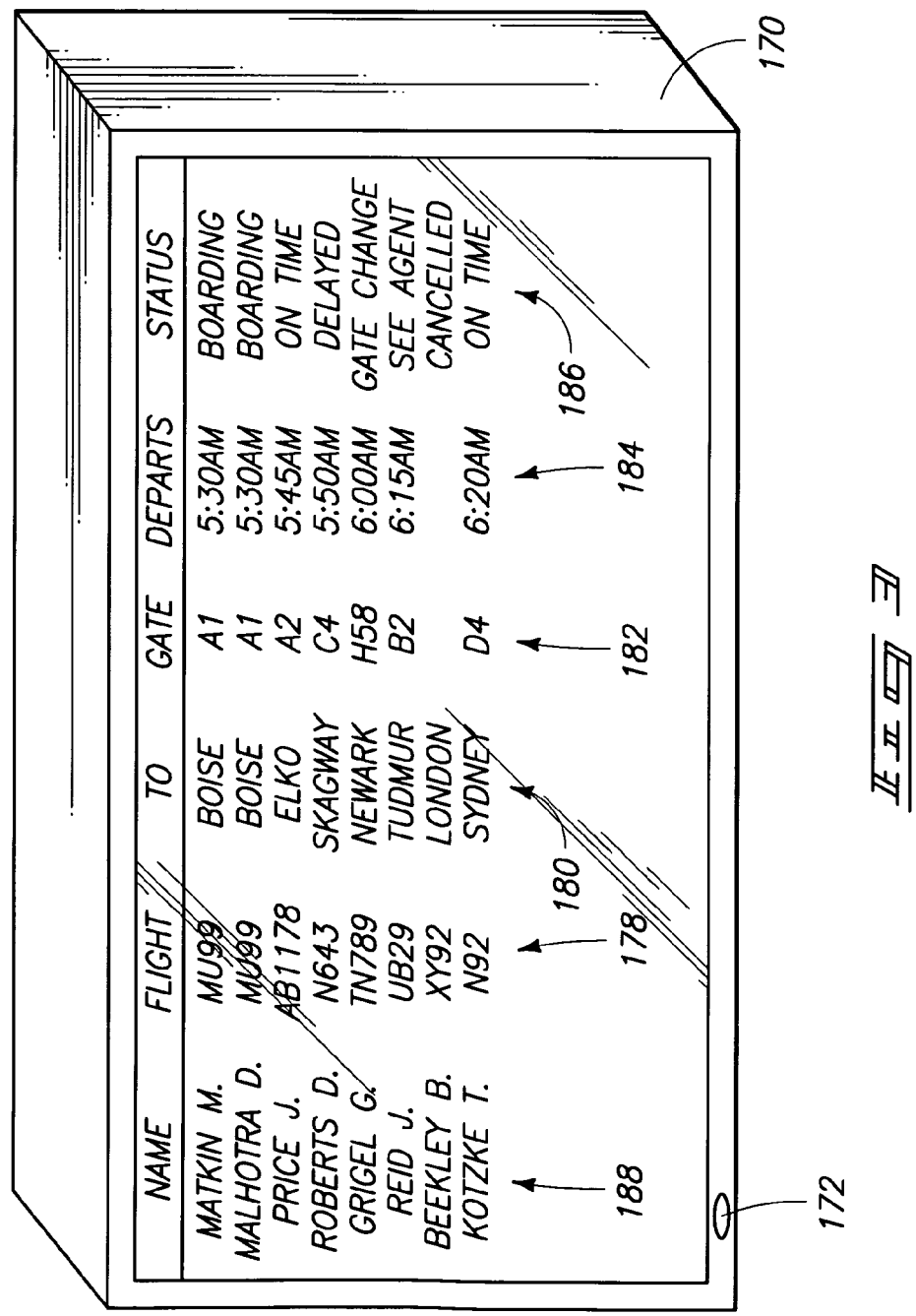
FIG. 3

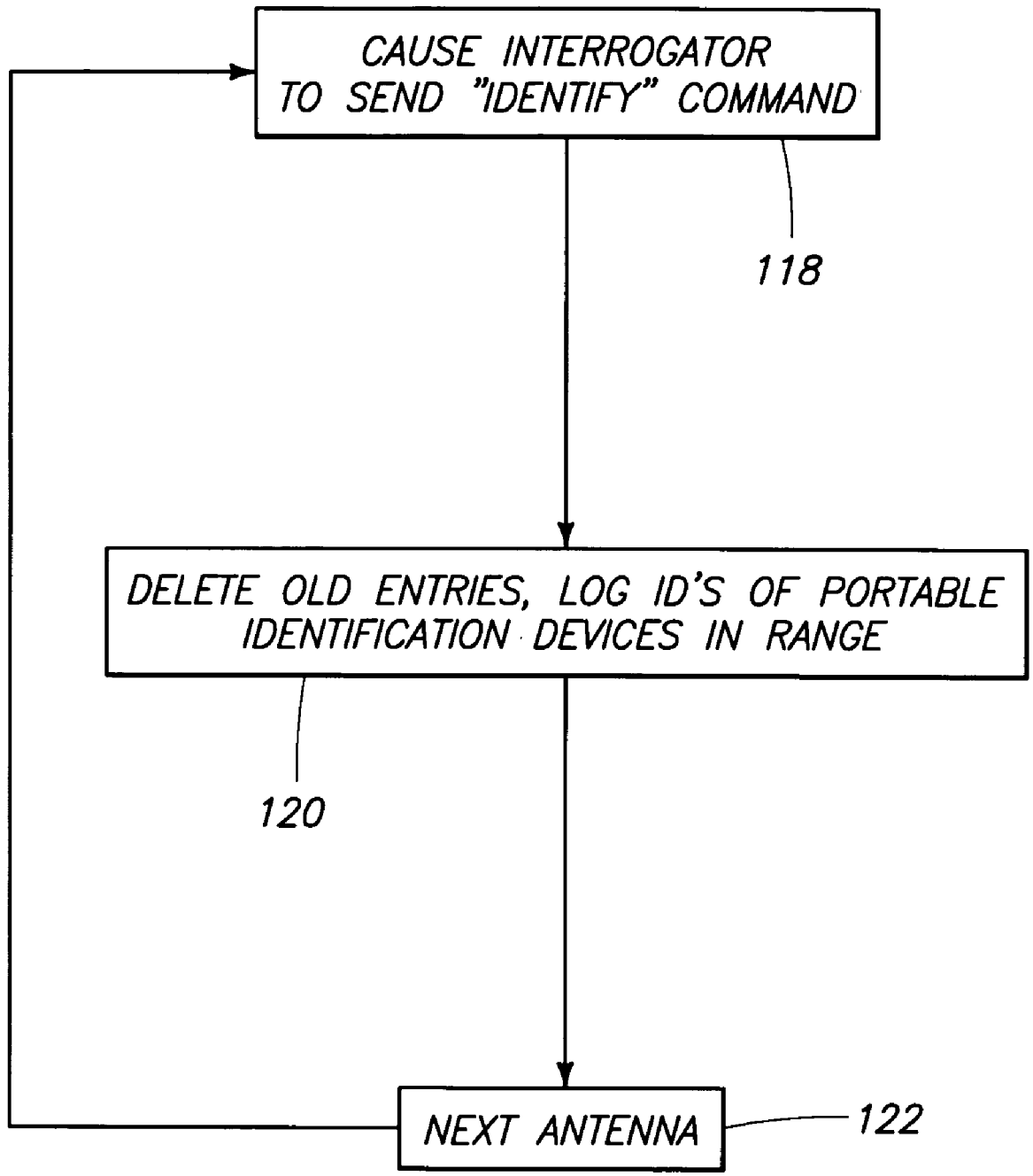

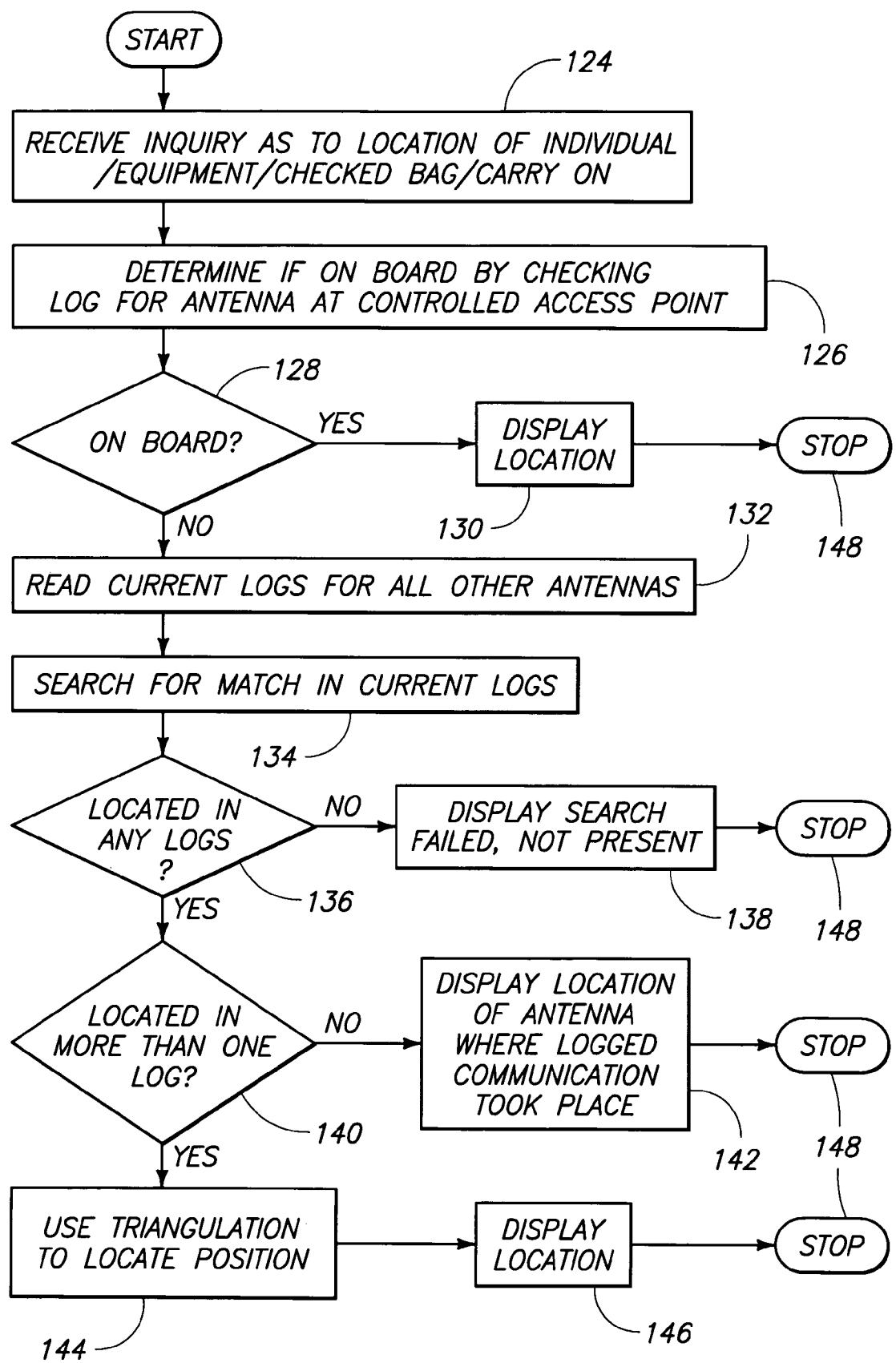

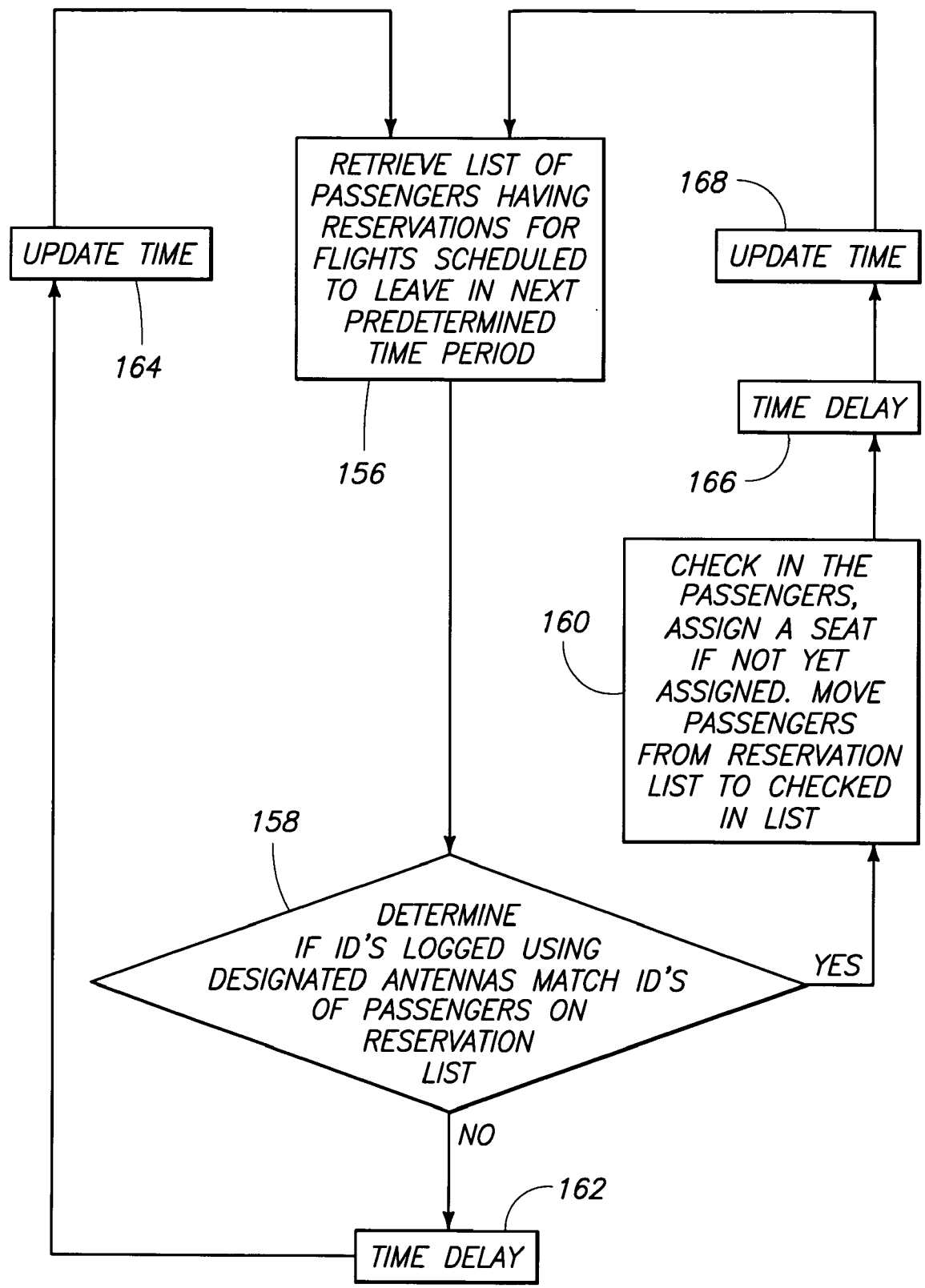

SYSTEM AND METHOD FOR LOCATING INDIVIDUALS AND EQUIPMENT, AIRLINE RESERVATION SYSTEM, COMMUNICATION SYSTEM

CROSS-REFERENCE TO RELATED APPLICATION

This is a continuation of U.S. patent application Ser. No. 10/326,762, filed Dec. 20, 2002, now U.S. Pat. No. 7,030,732, titled "System and Method for Locating Individuals and Equipment, Airline Reservation System, Communication System", which is a continuation of U.S. patent application Ser. No. 09/628,876, filed Jul. 26, 2000, now U.S. Pat. No. 6,509,829, issued Jan. 21, 2003, which in turn is a continuation of U.S. patent application Ser. No. 09/305,182, filed May 3, 1999, now U.S. Pat. No. 6,127,917, issued Oct. 3, 2000, which in turn is a continuation of U.S. patent application Ser. No. 08/807,678, filed Feb. 27, 1997, now U.S. Pat. No. 5,914,671, issued Jun. 22, 1999, all of which are incorporated herein by reference.

TECHNICAL FIELD

The invention relates to personnel locating systems, travel reservation systems, airport security systems, radio frequency identification devices.

BACKGROUND OF THE INVENTION

Travel reservation and baggage tracking systems are known in the art. Passengers typically purchase tickets in advance of travel, and are included in a database of a reservation system as having a reservation. On the date of travel, they must check in, or their seat will be given up to other passengers. Because statistics show that there will always be a number of passengers who will not show up on the designated date of travel, carriers typically "overbook" by selling a number of seats over the number of seats that are actually available, based on mathematical calculations. If the passenger does not check in, their seat may be used to accommodate overbooking, or may be given to standby passengers. The following U.S. patents relate to reservation systems and are incorporated herein by reference: U.S. Pat. Nos. 5,401,944; 5,151,692; 5,051,565; 5,010,240; 4,984,156; 4,931,932; 4,449,186; 4,247,795; 3,750,103.

When a passenger enters a travel depot (e.g., an airport), they must therefore check in to make sure the carrier (e.g., airline) knows they are present and to make sure that their seat is not given away to someone else. This typically involves standing in line and waiting for an employee to verify that the correct traveler is bearing a ticket. The employee receives the ticket and, using a reservation system, issues a boarding pass, with a seat assignment, indicating to the system that the seat is no longer available to be given away.

Traditionally, check in occurred simultaneously with a baggage check-in, with an employee marking the traveler's luggage with a tag indicting the destination where the bag is to be sent, printing a baggage receipt for the customer, and logging the bag in the reservation and baggage handling system.

Business travelers, however, typically do not have any bags to check and prefer not to wait in line. Also, many airports offer curbside check-in, which allows a passenger to check in bags at the curb before entering the airport, where lines are shorter because a gratuity is expected. The business travelers and travelers who have used the curbside check in typically go directly to the podium adjacent the departure gate and check in there. While the line at the podium may be shorter, it is still a line. Travelers needing to check in baggage must wait in lines.

There are many reasons why it would be useful to determine the presence of an individual in an airport or other travel depot. If a flight is about to leave, airline staff may desire to make an attempt to determine if a checked in passenger is in the airport. It is also frequently desirable to locate airline staff, such as pilots, flight attendants, wheelchair attendants, mechanics etc., or airport staff, such as security, or merchants or other persons who work in airports, for a variety of reasons. This is presently attempted through paging, which is sometimes difficult to hear, and is often annoying or competing with more important messages, such as gate change announcements, or information about which rows are boarding.

It is also useful to determine the location of a passenger in evaluating terrorist threats. A terrorist who has planted a bomb in his or her luggage is likely to leave the premises and not board the flight for which the luggage was checked.

Passengers in airports typically need gate and flight information in a hurry. Such information may be obtained from airline staff, but this typically involves standing in long lines. This information is therefore more typically gathered by reading a monitor which lists flight numbers, destinations, gates, and status. A problem is that in some airports, each airline has their own monitors, so a traveler may have to walk a great distance to try to find a monitor for a particular airline. Monitors also contain vast amounts of information, most of it of no interest to a particular traveler. This makes it difficult to find useful information in a hurry.

Switching antennas connected to an interrogator is disclosed in commonly assigned U.S. patent application Ser. No. 08/772,173, filed Dec. 18, 1996, titled "Communication System Including Diversity Antenna Queuing," and listing Clifton W. Wood, Jr. as inventor, now U.S. Pat. No. 5,842,118. Antenna switching for this application is performed for diversity purposes.

SUMMARY OF THE INVENTION

In one embodiment of the present invention, a reservation system includes a database configured to store information identifying customers who have purchased tickets for an event, information about the scheduled time for the event, and information identifying customers who have arrived; a controller configured to operate on the database; and an interrogator in communication with the controller, and an antenna coupled to the interrogator, the interrogator being configured to send wireless commands requesting wireless responses from portable identification devices, the portable identification devices being configured to transmit identifying data in response to receiving a command, the interrogator having a predetermined communications range and being configured to communicate with portable identification devices within the predetermined communications range, the controller being configured to modify the database to indicate that one of the customers who purchased a ticket has arrived, responsive to the interrogator receiving a response from the portable identification device associated with that customer, which response includes identifying data for that customer.

Many other features and embodiments of the present invention will be apparent from the accompanying drawings and from the following detailed description.

BRIEF DESCRIPTION OF THE DRAWINGS

Preferred embodiments of the invention are described below with reference to the following accompanying drawings.

FIG. 3 is a perspective view showing a monitor included in the system of FIG. 2.

FIG. 12 is a flow chart illustrating a routine run by the system of FIG. 1 or 2 to log locations of individuals.

FIG. 13 is a flow chart illustrating a routine run by the system of FIG. 1 or 2, used in connection with the routine of FIG. 12, to determine the location of an individual.

FIG. 14 is a flow chart illustrating a routine run by the system of FIG. 2 to check in a passenger using the card of FIG. 4 or 10 as an electronic boarding pass.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
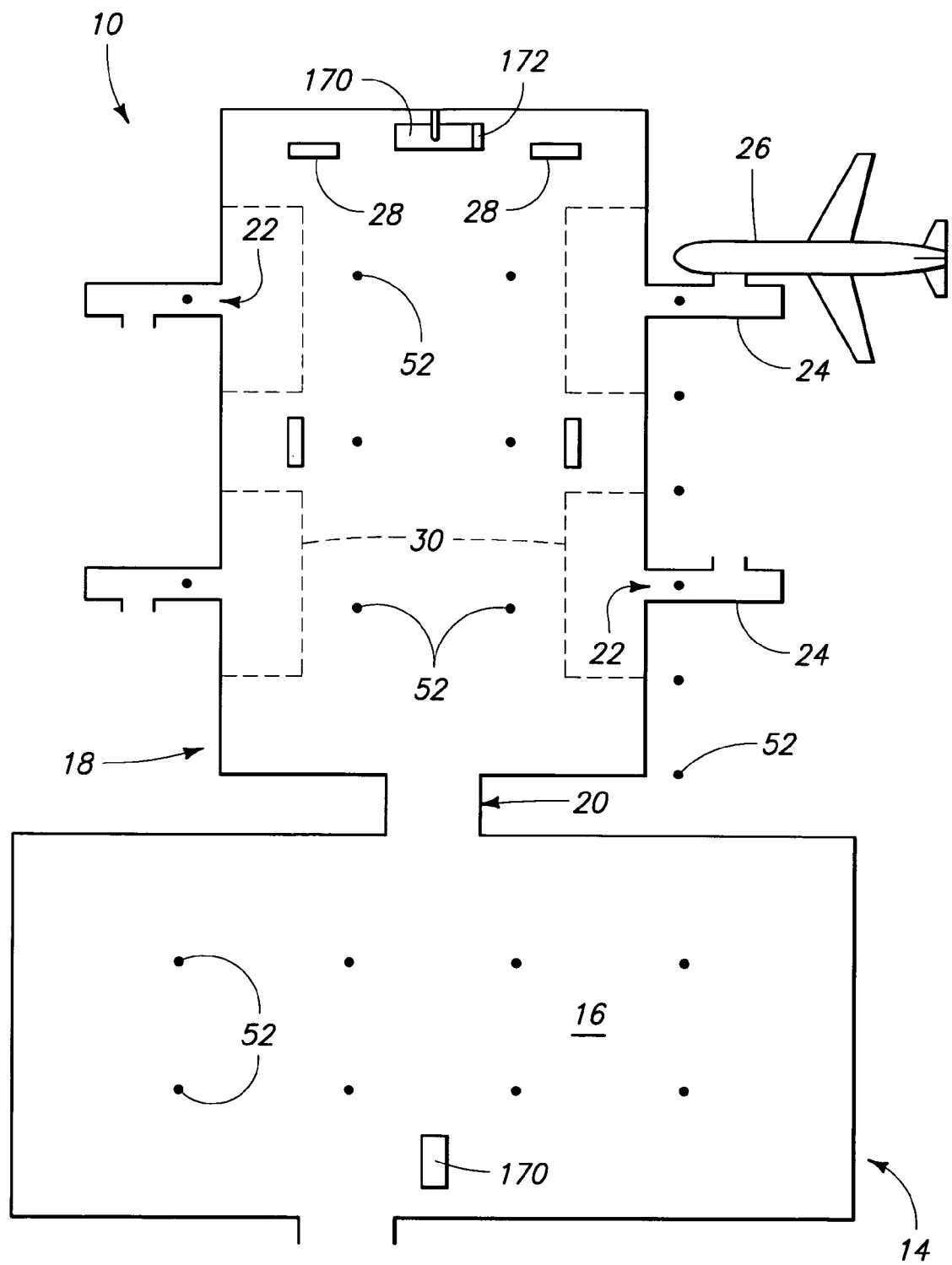
FIG. 1 is a plan view of a travel depot facility, such as an airport, including a system, embodying the invention, for locating an individual.

FIG. 1 shows a travel depot facility 10, such as an airport, including a system 12 (see FIG. 2) for locating an individual. The facility 10 includes various areas of a typical facility such as a main terminal area 14 which typically includes a baggage check in area 16, shops, restaurants, etc. The facility 10 further includes a terminal concourse area 18 which one enters after passing a security check point 20. The terminal concourse area 18 includes multiple gate doors 22 defining controlled access points. More particularly, the gate doors 22 are typically locked until a flight is available for departure or is being deplaned. Airline staff control passage through the gate doors and only permit people with boarding passes through the gate doors 22. The gate doors 22 lead to jetways 24 which are movable to define a path into an airplane. The terminal area 18 typically includes podiums 28 where airline personnel are located. The terminal area 18 also includes multiple seating areas 30 which may be grouped off by gate.

The system 12 (see FIG. 2) includes portable wireless transponder devices 32 borne by passengers, airport employees, contractors, airline and contractor employees, etc. In the illustrated embodiment, the devices 32 include circuitry such as the circuitry described in detail in commonly assigned U.S. patent application Ser. No. 08/705,043, filed Aug. 29, 1996, now U.S. Pat. No. 6,130,602, and incorporated herein by reference. In one embodiment, the portable transponder devices 32 have card shaped housings with length and width dimensions corresponding to standard length and width dimensions of credit cards. In one embodiment, the transponder devices 32 include photographs of the respective individuals associated with the devices. The transponder devices 32 are, more particularly, intelligent radio frequency identification devices or remote intelligent communications (RIC) devices which communicate at microwave frequencies.

Figure 4:
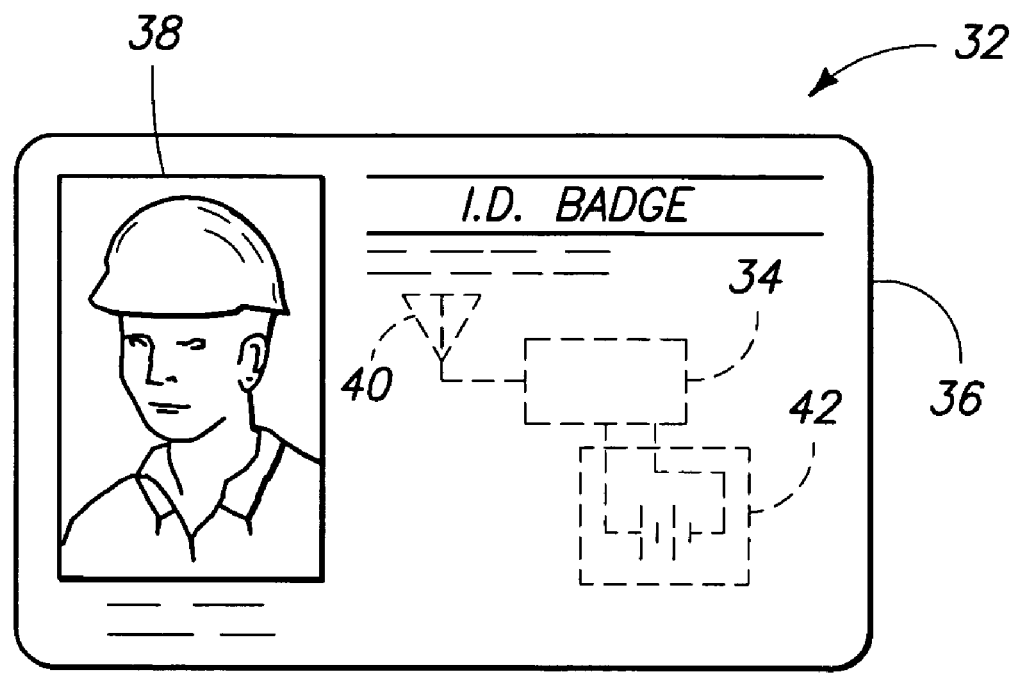
FIG. 4 is a front view of a card used in the system of FIG. 1 or 2.

FIG. 4 shows but one example of a housing for a device 32, in the form of an employee identification badge or card including an intelligent radio frequency identification device integrated circuit 34. The integrated circuit 34 includes a transmitter, a receiver, a microprocessor, and a memory. The housing for the device 32 shown in FIG. 4 includes a card 36 made of plastic or other suitable material. In one embodiment, the integrated circuit 34 is laminated to the back face of the card 36, and the card forms a visible portion of the badge. In another embodiment, the integrated circuit 34 is bonded to the back face of the card by embedding it within a thin bond line of epoxy-based material. Alternatively, the integrated circuit 34 is embedded into the plastic card 36. In one embodiment, the front face of the badge has visual identification features including a photograph 38 of the bearer as well as identifying text. The device 32 further includes a send/receive antenna 40 coupled to the integrated circuit 34, and a battery 42 coupled to the integrated circuit 34 to supply power to the integrated circuit. The battery 42 and antenna 40 are embedded or supported inside the plastic card 36.

The battery 42 can take any suitable form. Preferably, the battery type will be selected depending on weight, size, and life requirements for a particular application. In one embodiment, the battery 42 is a thin profile button-type cell forming a small, thin energy cell more commonly utilized in watches and small electronic devices requiring a thin profile. A button-type cell has a pair of electrodes, an anode formed by one face and a cathode formed by an opposite face. Exemplary button-type cells are disclosed in several pending U.S. patent applications including U.S. patent application Ser. No. 08/205,957, "Button-Type Battery Having Bendable Construction and Angled Button-Type Battery," listing Mark E. Tuttle and Peter M. Blonsky as inventors, now U.S. Pat. No. 5,432,027; U.S. patent application Ser. No. 08/321,251, "Button-Type Batteries and Method of Forming Button-Type Batteries," listing Mark E. Tuttle as inventor, now U.S. Pat. No. 5,494,495; and U.S. patent application Ser. No. 08/348,543, "Method of Forming Button-Type Batteries and a Button-Type Battery Insulating and Sealing Gasket," listing Mark E. Tuttle as inventor. These patent applications and resulting patents are hereby incorporated by reference. In an alternative embodiment, the battery 42 comprises a series connected pair of button type cells. Alternative power supplies can be used instead of batteries, in alternative embodiments.

Figure 5:
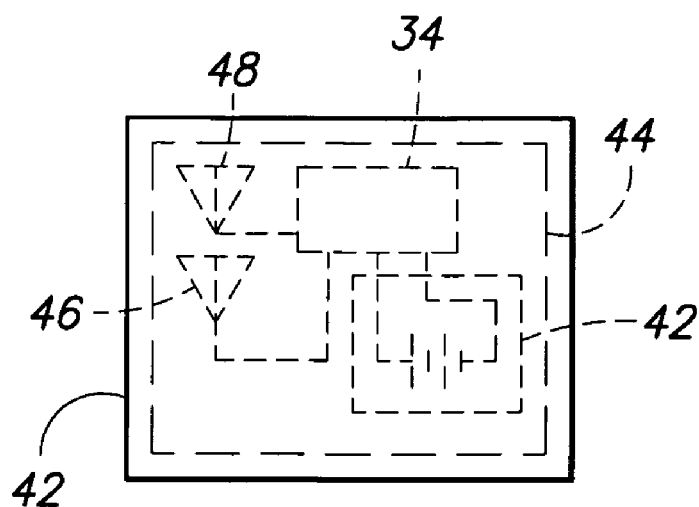
FIG. 5 is a circuit schematic of an interrogator included in the system of FIG. 1 or 2.

FIG. 5 illustrates but one alternative housing supporting the circuit 34. More particularly, FIG. 5 illustrates a miniature housing 42 encasing the circuit 34 to define a tag which can be supported by a person or object. The housing 42 preferably has the general shape and size, in plan view, of a postage stamp. The embodiment of FIG. 5 also houses a card 44 supporting the circuit 34 in the housing 42. The card 44 is formed of plastic or other suitable material having a thickness of about 0.040 inches, a width of about 1.25 inches, and a height of about 1.25 inches. In one embodiment, the circuit 34 is bonded to a back face of the card 44 with a thin layer of non-conductive epoxy material that cooperates with the card to define the housing 42. The circuit 34 is coupled to a send antenna 48, and a receive antenna 46, and receives power from a battery 42 which can be similar to the battery included in the embodiment of FIG. 4. The battery 42, and antennas 46 and 48 are supported in the housing 42 by the card 44.

Although two particular types of housings have been disclosed, the circuit 34 can be included in any appropriate housing. The circuit 34 is of a small size that lends itself to applications employing small housings, such as cards, miniature tags, etc. Larger housings can also be employed. The circuit 34, housed in any appropriate housing, can be supported from a person, or attached to a object (or a peoples possessions) in any desired manner; for example using double sided tape, glue, lanyards, leash, nails, staples, rivets, or any other fastener. The housing can be sewn on to an object, hung from an object, implanted in an object (hidden), etc.

Various configurations are possible for the antenna connected to the circuit 34. In one embodiment, separate antennas 46 and 48 are provided for receiving and sending (FIG. 5). In another embodiment, a single antenna 40 is shared by the receiver and transmitter (FIG. 4). In one embodiment, one or more antennas are defined by conductive epoxy screened onto a card or housing. In the illustrated embodiment, the antenna is conductively bonded to the integrated circuit 34 via bonding pads.

The system 12 further includes an interrogator 50. The card 36 transmits and receives radio frequency communications to and from the interrogator 50. The system 12 further includes an array of antennas 52 (or send/receive antenna pairs) alternately coupled to the interrogator 50. The interrogator 50 includes transmitting and receiving circuitry, similar to that implemented in the circuit 34. In one embodiment, the system 12 further includes a controller 54. In the illustrated embodiment, the controller 54 is a computer. The controller 54 acts as a master in a master-slave relationship with the interrogator 50. The controller 54 includes an applications program for controlling the interrogator 50 and interpreting responses, and a library of radio frequency identification device applications or functions. Most of the functions communicate with the interrogator 50. These functions effect radio frequency communication between the interrogator 50 and the card 32. In one embodiment, the controller 54 and the interrogator 50 are combined together (e.g., in a common housing), or functions of the host computer are implemented in hard wired digital logic circuitry.

In the illustrated embodiment, the communications system 10 includes multiple selectable transmit antennas X1, X2, X3 etc., and multiple receive antennas R1, R2, R3 etc. connected to the interrogator 50. Each antenna pair X1, R1, X2, R2, etc. defines an antenna 52 of the antenna array for purposes of the discussion below. In one embodiment, the communications system 10 includes combined antennas that are used both for transmitting and receiving by the interrogator 50. Generally, the interrogator 50 transmits an interrogation signal or command, such as an "Identify" command, ("forward link") via one of the antennas 52. The card 32 receives the incoming interrogation signal via its antenna, if it is within receiving range of the particular antenna 52 used to transmit. Upon receiving the signal, the card 32 responds by generating and transmitting a responsive signal or reply ("return link"). The interrogator 50 is described in greater detail below.

In the illustrated embodiment, the responsive signal is encoded with information that uniquely identifies, or labels the particular card 32 that is transmitting, so as to identify any object or person with which the card 32 is associated.

Figure 2:
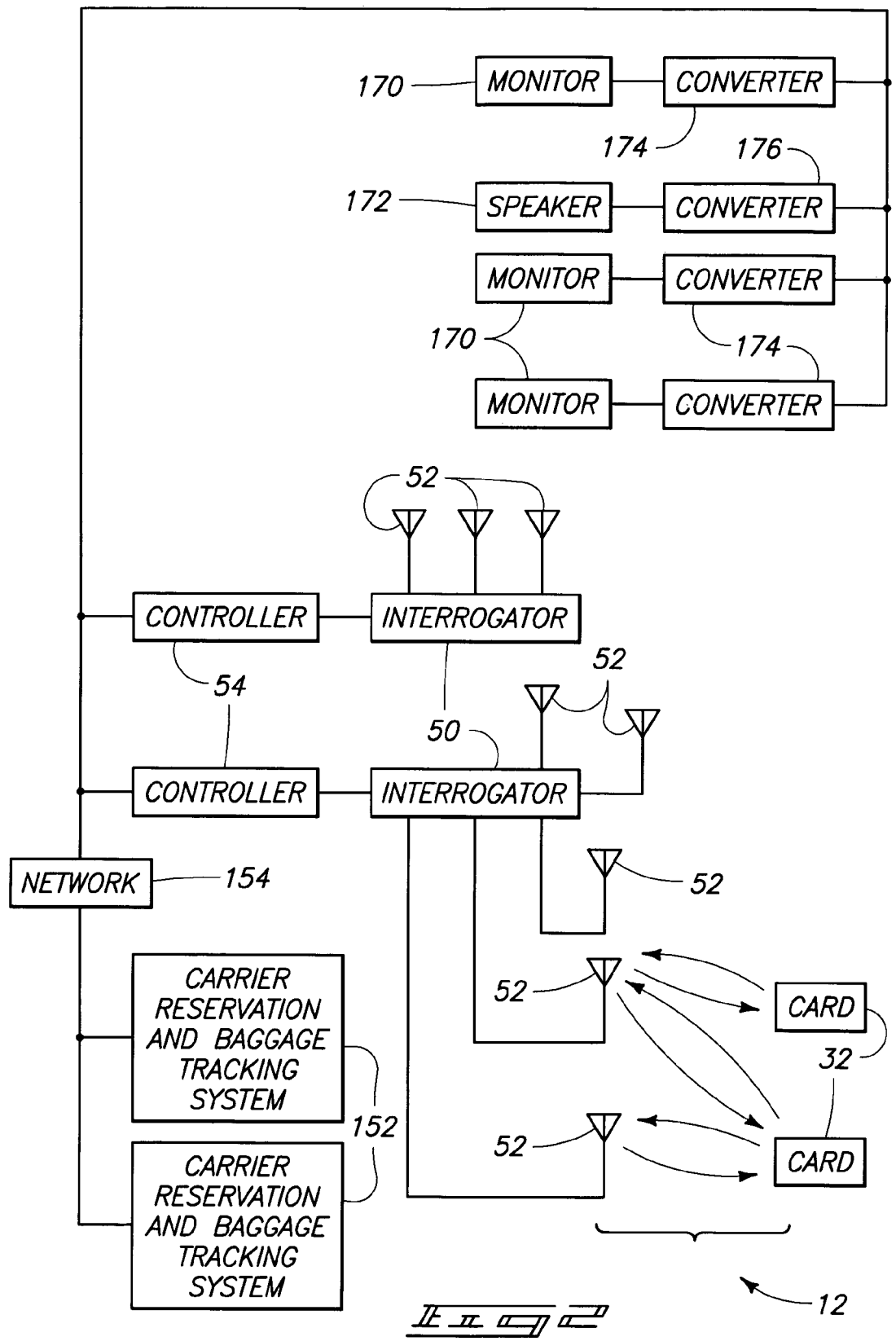
FIG. 2 is a block diagram of the system of FIG. 1, further including an interface with an airline reservation and baggage tracking system, and further including monitors for displaying information of particular interest to passengers in the area of the monitor.

In the embodiment illustrated in FIG. 2, multiple cards 32 are employed; however, there is no communication between the cards 32. Instead, the multiple cards 32 communicate with the interrogator 50. Multiple cards 32 can be used in the same range of an antenna 52.

Various U.S. patent applications, which are incorporated herein by reference, disclose features that are employed in various alternative embodiments of the invention: Ser. No. 08/092,147, filed Jul. 15, 1993, "Wake Up Device for a Communications System" and continuation application Ser. No. 08/424,827, filed Apr. 19, 1995, "Wake Up Device for a Communications System"; Ser. No. 08/281,384, filed Jul. 27, 1994, "Communication System Having Transmitter Frequency Control"; Ser. No. 07/990,918, filed Dec. 15, 1992, now U.S. Pat. No. 5,365,551, "Data Communication Transceiver Using Identification Protocol"; Ser. No. 07/899,777, filed Jun. 17, 1992, "Radio Frequency Identification Device (RFID) and Method of Manufacture, Including an Electrical Operating System and Method," now abandoned; Ser. No. 07/151,599, filed Nov. 12, 1993, now U.S. Pat. No. 5,406,263, "Anti-Theft Method for Detecting The Unauthorized Opening of Containers and Baggage,"; Ser. No. 07/168,909, filed Dec. 17, 1993, now Pat. No. 5,497,140, "Electrically Powered Postage Stamp or Mailing or Shipping Label Operative with Radio Frequency (RF) Communication,"; and Ser. No. 08/032,384, filed on Mar. 17, 1993, "Modulated Spread Spectrum in RF Identification Systems Method," now allowed.

The integrated circuit 34 is advantageous over prior art devices that utilize magnetic field effect systems because, with the circuit 34, a greater range can be achieved, and more information can be obtained (instead of just an identification number). As a result, the circuit 34 can be used for the application of the present invention, where transmission over a large range is required. In one embodiment, the sensitivity of the cards 32 is adjustable so that only devices within an adjustable range of an antenna 52 will respond. In another embodiment, the power of the interrogator 50 is adjustable so that only devices within a certain range of an antenna 52 will respond.

A power conservation problem is posed by such implementations where batteries are used to supply power to the integrated circuits 34. If the integrated circuit 34 operates continuously at full power, battery life will be short, and card 32 will have to be frequently replaced. If the battery 42 is permanently sealed in a housing, replacement of the battery will be difficult or impossible. For example, one reason for sealing the battery with the integrated circuit 34 and antenna(s) in a housing is to simplify the design and construction, to reduce the cost of production, and protect the electrical interconnections between devices. Another reason is protection of the battery and integrated circuit 34 from moisture and contaminants. A third reason is to enhance the cosmetic appeal of the card 32 by eliminating the need for an access port or door otherwise necessary to insert and remove the battery. When the battery is discharged, the entire badge or stamp is then discarded. It is therefore desirable to incorporate power conservation techniques into the integrated circuit 32 in order to extend useful life.

Figure 6:
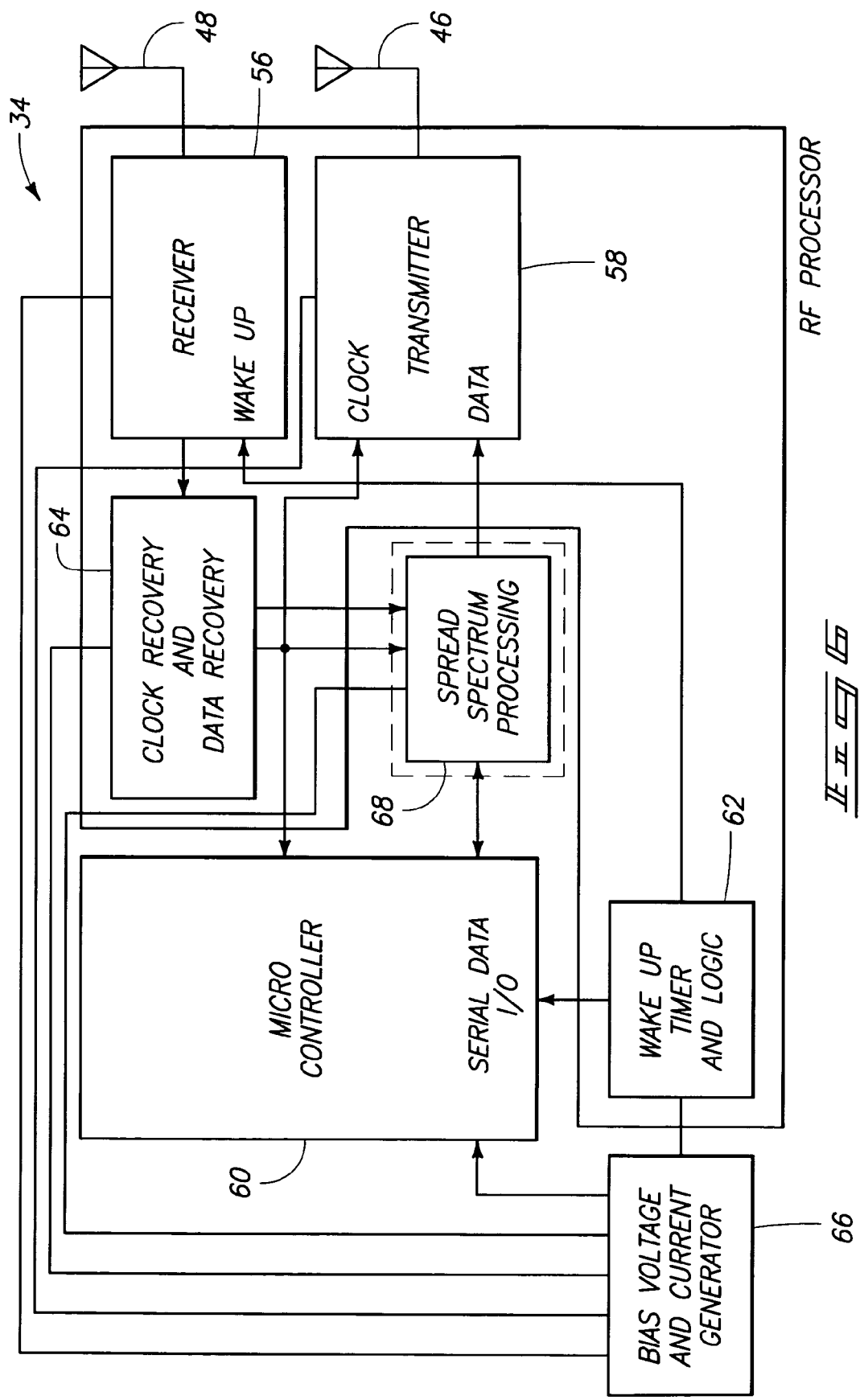
FIG. 6 is a circuit schematic of circuitry included in card of FIG. 4.

FIG. 6 is a circuit schematic of the integrated circuit 34 utilized in the devices of FIG. 4 or 5. In the embodiment shown in FIG. 6, the circuit 34 is a monolithic integrated circuit. In the illustrated embodiment, the integrated circuit 34 comprises a single die, having a size of 209×116 mils². The integrated circuit 34 includes a receiver 56, a transmitter 58, a micro controller or microprocessor 60, a wake up timer and logic circuit 62, a clock recovery and data recovery circuit 64, and a bias voltage and current generator 66.

In one embodiment, the circuit 34 switches between a "sleep" mode of operation, and higher power modes to conserve energy and extend battery life during periods of time where no interrogation signal is received by the circuit 34. The wake up timer and logic circuitry 62 provides this switching.

In one embodiment, a spread spectrum processing circuit 68 is also included in the circuit 34. In this embodiment, signals transmitted and received by the interrogator 50, and signals transmitted and received by the circuit 34 are modulated spread spectrum signals. Spread spectrum modulation is described below. In one illustrated embodiment, the modulation scheme for replies sent by the transmitter 58 is selectable. One of the available selections for replies sent by the transmitter 58 is modulated spread spectrum.

Spread Spectrum Modulation

Many modulation techniques minimize required transmission bandwidth. However, the spread spectrum modulation technique employed in the illustrated embodiment requires a transmission bandwidth that is up to several orders of magnitude greater than the minimum required signal bandwidth. Although spread spectrum modulation techniques are bandwidth inefficient in single user applications, they are advantageous where there are multiple users, as is the case with the instant circuit 34. The spread spectrum modulation technique of the illustrated embodiment is advantageous because the interrogator signal can be distinguished from other signals (e.g., radar, microwave ovens, etc.) operating at the same frequency. The spread spectrum signals transmitted by the circuit 34 and by the interrogator 50 are pseudo random and have noise-like properties when compared with the digital command or reply. The spreading waveform is controlled by a pseudo-noise or pseudo random number (PN) sequence or code. The PN code is a binary sequence that appears random but can be reproduced in a predetermined manner by the circuit 34. More particularly, incoming spread spectrum signals are demodulated by the circuit 34 or by the interrogator 50 through cross correlation with a version of the pseudo random carrier that is generated by the circuit 34 itself or the interrogator 50 itself, respectfully. Cross correlation with the correct PN sequence unspreads the spread spectrum signal and restores the modulated message in the same narrow band as the original data.

A pseudo-noise or pseudo random sequence (PN sequence) is a binary sequence with an autocorrelation that resembles, over a period, the autocorrelation of a random binary sequence. The autocorrelation of a pseudo-noise sequence also roughly resembles the autocorrelation of band-limited white noise. A pseudo-noise sequence has many characteristics that are similar to those of random binary sequences. For example, a pseudo-noise sequence has a nearly equal number of zeros and ones, very low correlation between shifted versions of the sequence, and very low cross correlation between any two sequences. A pseudo-noise sequence is usually generated using sequential logic circuits. For example, a pseudo-noise sequence can be generated using a feedback shift register.

A feedback shift register comprises consecutive stages of two state memory devices, and feedback logic. Binary sequences are shifted through the shift registers in response to clock pulses, and the output of the various stages are logically combined and fed back as the input to the first stage. The initial contents of the memory stages and the feedback logic circuit determine the successive contents of the memory.

The illustrated embodiment employs direct sequence spread spectrum modulation. A direct sequence spread spectrum (DSSS) system spreads the baseband data by directly multiplying the baseband data pulses with a pseudo-noise sequence that is produced by a pseudo-noise generator. A single pulse or symbol of the PN waveform is called a "chip." Synchronized data symbols, which may be information bits or binary channel code symbols, are added in modulo-2 fashion to the chips before being modulated. The receiver performs demodulation. For example, in one embodiment the data is phase modulated, and the receiver performs coherent or differentially coherent phase-shift keying (PSK) demodulation. In another embodiment, the data is amplitude modulated. Assuming that code synchronization has been achieved at the receiver, the received signal passes through a wideband filter and is multiplied by a local replica of the PN code sequence. This multiplication yields the unspread signal.

A pseudo-noise sequence is usually an odd number of chips long. In the illustrated embodiment, one bit of data is represented by a thirty-one chip sequence. A zero bit of data is represented by inverting the pseudo-noise sequence.

Spread spectrum techniques are also disclosed in the following patent applications and patent, which are incorporated herein by reference: U.S. patent application Ser. Nos. 08/092,147; 08/424,827, filed Apr. 19, 1995, now U.S. Pat. Nos. 5,790,946; and 5,121,407 to Partyka et al. They are also disclosed, for example, in "Spread Spectrum Systems," by R. C. Dixon, published by John Wiley and Sons, Inc.

Backscatter and Frequency Hopping

The interrogator 50 sends out a command that is spread around a certain center frequency (e.g, 2.44 GHz). After the interrogator transmits the command, and is expecting a response, the interrogator switches to a CW mode (continuous wave mode). In the continuous wave mode, the interrogator does not transmit any information. Instead, the interrogator just transmits 2.44 GHz radiation. In other words, the signal transmitted by the interrogator is not modulated. After the circuit 34 receives the command from the interrogator, the circuit 34 processes the command. If the circuit 34 is in a backscatter mode it alternately reflects or does not reflect the signal from the interrogator to send its reply. For example, in the illustrated embodiment, two halves of a dipole antenna are either shorted together or isolated from each other to send a reply.

Frequency hopping is employed in one embodiment. In the illustrated embodiment, frequency hopping does not occur when the interrogator transmits a command, but occurs when the interrogator is in the continuous wave mode. The interrogator, in the continuous wave mode, hops between various frequencies close to the 2.44 GHz frequency. These various frequencies are sufficiently close to the 2.44 GHz frequency that backscatter antenna reflection characteristics of the circuit 34 are not appreciably altered. Because the interrogator is hopping between frequencies, the interrogator knows what frequency backscatter reflections to expect back from the circuit 34. By hopping between various frequencies, the amount of time the interrogator continuously uses a single frequency is reduced. This is advantageous in view of FCC regulatory requirements.

In one illustrated embodiment, no attempt is made to frequency hop at the interrogator to a pseudo-random sequence and then correlate to that at the receiver. However, in alternative embodiments, such correlation takes place.

In one embodiment, the transmitter 58 is switchable between operating in a modulated backscatter transmitter mode, and operating in an active mode. The transmitter 58 switches between the backscatter mode and the active mode in response to a radio frequency command, instructing the transmitter to switch, sent by the interrogator 50 and received by the receiver 56. In the active mode, a carrier for the transmitter 58 is extracted from a signal received by the receiver 56.

Active transmitters are known in the art. See, for example, U.S. patent application Ser. No. 08/281,384. U.S. patent application Ser. No. 08/281,384 also discloses how transmit frequency for the transmitter 58 is recovered from a message received via radio frequency from the interrogator 50.

In one embodiment, the transmitter 58 is capable of transmitting using different modulation schemes, and the modulation scheme is selectable by the interrogator. More particularly, if it is desired to change the modulation scheme, the interrogator sends an appropriate command via radio frequency. In this embodiment, the transmitter can switch between multiple available modulation schemes such as Binary Phase Shift Keying (BPSK), Direct Sequence Spread Spectrum, On-Off Keying (OOK), and Modulated Backscatter (MBS).

In one embodiment, the clock for the entire integrated circuit 16 is extracted from the incoming message itself by clock recovery and data recovery circuitry 64. This clock is recovered from the incoming message, and used for timing for the micro controller 60 and all the other clock circuitry on the chip, and also for deriving the transmitter carrier or the subcarrier, depending on whether the transmitter is operating in active mode or backscatter mode.

In addition to recovering a clock, the clock recovery and data recovery circuit 64 also performs data recovery on valid incoming signals. The valid spread spectrum incoming signal is passed through the spread spectrum processing circuit 68, and the spread spectrum processing circuit 68 extracts the actual ones and zeros of data from the incoming signal. More particularly, the spread spectrum processing circuit 68 takes the chips from the spread spectrum signal, and reduces each thirty-one chip section down to a bit of one or zero, which is passed to the micro controller 60.

The micro controller 60 includes a serial processor, or I/O facility that received the bits from the spread spectrum processing circuit 68. The micro controller 60 performs further error correction. More particularly, a modified hamming code is employed, where each eight bits of data is accompanied by five check bits used by the micro controller 60 for error correction. The micro controller 60 further includes a memory, and after performing the data correction, the micro controller 60 stores bytes of the data bits in memory. These bytes contain a command sent by the interrogator 50. The micro controller 60 responds to the command.

For example, the interrogator 50 may send a command over one of the antennas 52 requesting that any integrated circuit 34 in communications range of that antenna 52 respond with the integrated circuit's identification number. Status information is also returned to the interrogator 50 from the integrated circuit 34 when the circuit 34 responds.

The transmitted replies have a format similar to the format of incoming messages. More particularly, a reply starts with a preamble (e.g., all zeros in active mode, or alternating double zeros and double ones in backscatter mode), followed by a Barker or start code which is thirteen bits long, followed by actual data.

No stop bits are included in the incoming message or reply, in the preferred embodiment. Instead, part of the incoming message describes how many bytes are included, so the integrated circuit 34 knows how much information is included. Similarly, part of the outgoing reply describes how many bytes are included, so the interrogator 50 knows how much information is included. The incoming message and outgoing reply preferably also include a check sum or redundancy code so that the integrated circuit 34 or the interrogator 50 can confirm receipt of the entire message or reply.

After the reply is sent, the integrated circuit 34 returns to the sleep mode, and the wake up timer and logic circuit 62 starts timing again for the next wake up (e.g., in 16 milliseconds, or whatever period is selected).

The interrogator 50 provides a communication link between the controller 54 and the integrated circuit 34. In one embodiment, the interrogator 50 connects to the controller 54 via an IEEE-1284 enhanced parallel port (EPP). The interrogator communicates with the circuit 34 via a selected RF (microwave) antenna 52.

In one embodiment, communications from the interrogator 50 to the circuit 34, and communications from the circuit 34 to the interrogator 50 use different physical protocols.

The physical communications protocol for communications from the interrogator 50 to the circuit 34 is referred to as the "forward link" protocol. The forward link data is sent in the following order:
Preamble
Barker Code
Command Packet
Check Sum A Maximal Length Pseudo Noise (PN) Sequence is used in the Direct Sequence Spread Spectrum (DSSS) communications scheme in the forward link. In one embodiment, the sequence is generated by a linear feedback shift register of the form [5,2]. That is, there are five registers, the output of the second register is X-ORed with the output of the fifth register, and the result is fed into the input of the first register one. This produces a repeating 31 "chip" sequence. The sequence ends with all registers set to one. The sequence is taken from the output of the first register. This code is synchronous with the data in that each data bit comprises one and only one full PN sequence. The chip sequence for each bit is: 001 1010 0100 0010 1011 1011 0001 1111.

Other embodiments are, of course, possible. For example, other forms of linear feedback shift registers can be employed.

In one embodiment, a zero bit is transmitted as one inverted full cycle of the PN sequence. A one bit is transmitted as one full non-inverted cycle of the PN sequence.

In the illustrated embodiment, the data is not differentially encoded.

In one embodiment, there are at least two available "chipping" rates. One rate is 9.5375 Mchips/sec (high band) and another rate is 4.768750 Mchips/sec (low band).

The preamble precedes the data. In one embodiment, the preamble includes a series of zeros, followed by a start or Barker code. In embodiments where the transponder 16 includes wake up timer and logic circuitry 36, the preamble includes a series of zeros for a duration equal to the wakeup interval (e.g., 5, 16, 64, or 256 ms) plus 2 milliseconds, followed by a start or Barker code.

In one embodiment, the Barker code is defined by the following bit string: 1111 1001 1010 1. Other embodiments are possible.

Command data is grouped into 13-bit words. Each word includes eight data bits (D7, D6, D5, D4, D3, D2, D1, D0) and five ECC (Error Correction Code) bits (P4, P3, P2, P1, and P0). In one embodiment, the bit transmission order is (with D7 transmitted first): D7, D6, D5, D4, D3, D2, D1, D0, P4, P3, P2, P1, P0 . . .

In one embodiment, the ECC bits (P4-P0) are generated using the following equations:

$$P0=(D1+D2+D5+D7) \text{ modulo } 2$$

$$P1=[(D1+D3+D4+D6) \text{ modulo } 2] \text{ Complement}$$

$$P2=(D0+D2+D3+D6+D7) \text{ modulo } 2$$

$$P3=[(D0+D4+D5+D6+D7) \text{ modulo } 2] \text{ Complement}$$

$$P4=(D0+D1+D2+D3+D4+D5) \text{ modulo } 2.$$

Data rates depend on which data band is being used. A high data band has an effective data rate (adjusting for PN and ECC) of 189.3 Kbps. A low data band has an effective data rate of 94.68 Kbps.

In the illustrated embodiment, a 16-bit check sum is provided to detect bit errors on the packet level. A circuit 34 can be programmed to either return a reply if a bad check sum is found in the forward link, or to simply halt execution and send no replies. In one embodiment, a 16 bit CRC is employed in the forward link, the return link, or both, instead of or in addition to the check sum.

The physical communications protocol for communications from the circuit 34 to the interrogator 50 is referred to as the "return link" protocol. In the illustrated embodiment, the return link messages are sent in the following order:
Preamble,
Barker Code,
Reply Packet
Check Sum After sending a command, the interrogator sends a continuous unmodulated RF signal with a frequency of 2.44175 Ghz. Return link data is Differential Phase Shift Key (DPSK) modulated onto a square wave subcarrier with a frequency of 596.1 Khz. A data 0 corresponds to one phase and data 1 corresponds to another, shifted 180 degrees from the first phase. The subcarrier is used to modulate antenna impedance of a card 32. For a simple dipole, a switch between the two halves of the dipole antenna is opened and closed. When the switch is closed, the antenna becomes the electrical equivalent of a single half-wavelength antenna that reflects a portion of the power being transmitted by the interrogator. When the switch is open, the antenna becomes the electrical equivalent of two quarter-wavelength antennas that reflect very little of the power transmitted by the interrogator. The switch driving a printed half wavelength dipole antenna gives a typical range of 15 feet when the interrogator 50 transmits at 30 dBm into a 6 dB gain antenna. Therefore, antennas 52 are located no more than 15 feet apart in areas of the facility 10 where it is desirable to locate people or objects.

The preamble for the return link includes 2000 bits, alternating 2 zeros then 2 ones, etc., and a 13-bit start (Barker) code. Alternative preambles are possible.

In the illustrated embodiment, the start code or Barker Code is defined by the following bit string: 1111 1001 1010 1.

The reply link data is grouped in 13 bit words. Each word is composed of 8 data bits (D7, D6, D5, D4, D3, D2, D1, D0) and 5 ECC bits (P4, P3, P2, P1, P0).

The Block Encoded Sequence is D7, D6, D5, D4, D3, D2, D1, D0, P4, P3, P2, P1, P0.

The Block ECC Bits (P4-P0) are generated using the following equations:

$$P0=(D1+D2+D5+D7) \text{ modulo } 2$$

$$P1=[(D1+D3+D4+D6) \text{ modulo } 2] \text{ Complement}$$

$$P2=(D0+D2+D3+D6+D7) \text{ modulo } 2$$

$$P3=[(D0+D4+D5+D6+D7) \text{ modulo } 2] \text{ Complement}$$

$$P4=(D0+D1+D2+D3+D4+D5) \text{ modulo } 2.$$

In the illustrated embodiment, the bit duration is 6.71 µs making the effective data rate 91.75 Kbps for the return link.

In the illustrated embodiment, a 16-bit check sum is provided to detect bit errors on the packet level. In one embodiment, a 16 bit CRC is employed in addition to or instead of the check sum.

Each pair of data words is interleaved, starting with the Barker code and the first data word. The transmitted bit order for two sequential words, A and B, is D7A, D7B, D6A, D6B, D5A, D5B, D4A, D4B, D3A, D3B, D2A, D2B, D1A, D1B, D0A, D0B, P4A, P4B, P3A, P3B, P2A, P2B, P1A, P1B, P0A, P0B.

D7A is the first transmitted bit. In the illustrated embodiment, DPSK is applied to the interleaved data.

Figure 7:
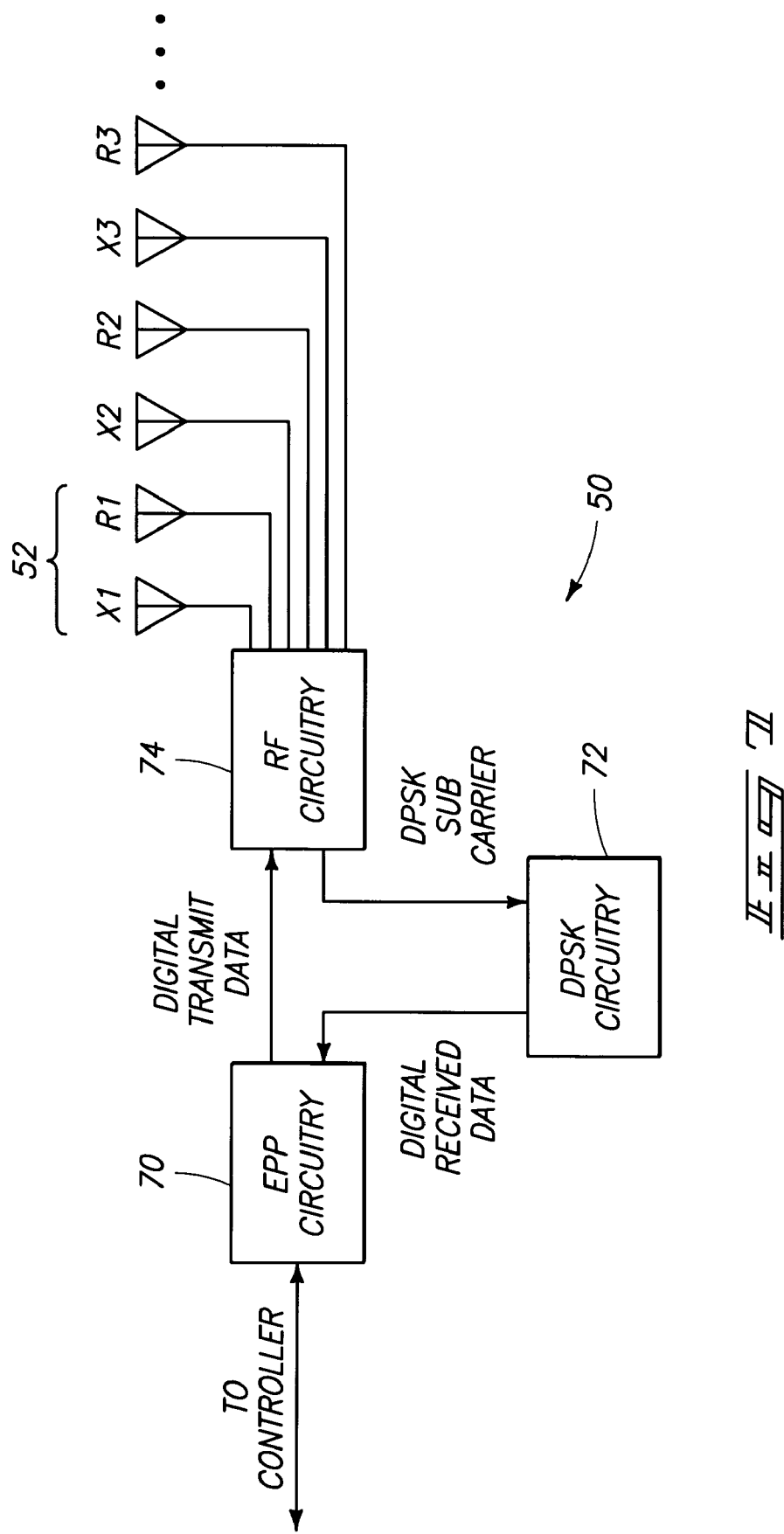
FIG. 7 is a block diagram of an interrogator included in the system of FIG. 1 or 2.

In one embodiment (see FIG. 7), the interrogator 50 includes enhanced parallel port (EPP) circuitry 70, DPSK (differential phase shift keyed) circuitry 72, and RF (radio frequency) circuitry 74, as well as a power supply (not shown) and a housing or chassis (not shown). In the illustrated embodiment, the enhanced parallel port circuitry 70, the DPSK circuitry 72, and the RF circuitry 74 respectively define circuit card assemblies (CCAs). The interrogator uses an IEEE-1284 compatible port in EPP mode to communicate with the controller 54. The EPP circuitry 70 provides all the digital logic required to coordinate sending and receiving a message to and from a circuit 34. The EPP circuitry 70 buffers data to transmit from the controller 54, converts the data to serial data, and encodes it. The EPP circuitry 70 then waits for data from the circuit 34, converts it to parallel data, and transfers it to the controller 54. In one embodiment, messages include up to 64 bytes of data.

The EPP mode interface provides an asynchronous, interlocked, byte wide, bidirectional channel controlled by the controller 54. The EPP mode allows the controller 54 to transfer, at high speed, a data byte to/from the interrogator within a single host computer CPU I/O cycle (typically 0.5 microseconds per byte).

Figure 8:
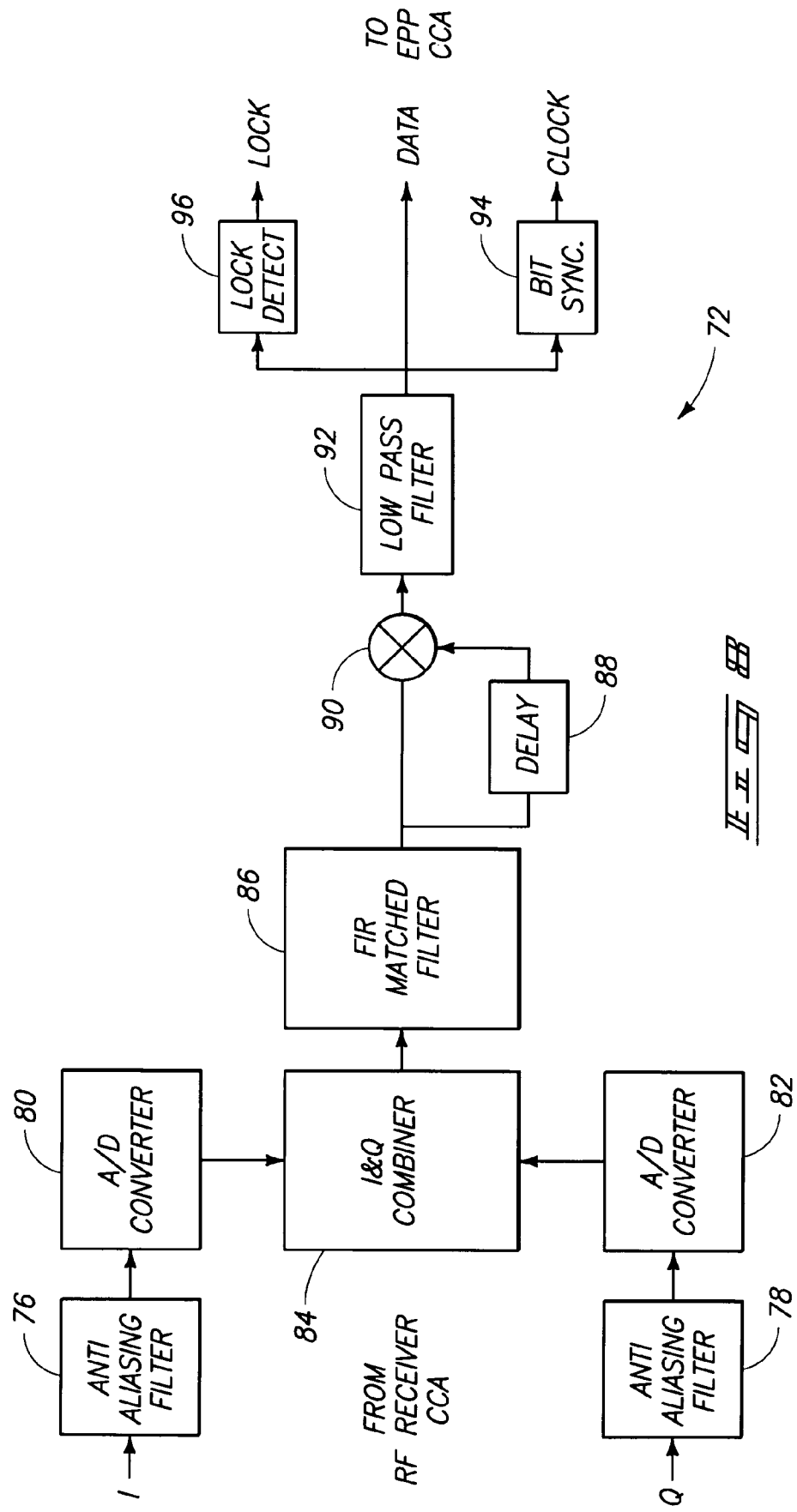
FIG. 8 is a circuit schematic of DPSK circuitry included in the interrogator of FIG. 7.

The DPSK circuitry 72 (see FIG. 8) receives signals I and Q from the RF circuitry 74 (described below), which signals contain the DPSK modulated sub-carrier. The DPSK circuitry 72 includes anti-aliasing filters 76 and 78 filtering the I and Q signals, respectively, and analog to digital (A/D) converters 80 and 82 respectively coupled to the filters 76 and 78 and respectively converting the filtered signals from analog to digital signals. The DPSK circuitry 72 further includes a combiner 84, coupled to the A/D converters 80 and 82, combining the digital signals. The DPSK circuitry 72 further includes a FIR matched filter 86, coupled to the combiner 84, which filters the combined signals. The DPSK circuitry 72 further includes delay circuitry 88 and multiplier circuitry 90 coupled to the FIR matched filter 86 for delaying the signal and multiplying the signal with the delayed signal to remove the sub-carrier. The DPSK circuitry 72 further includes low pass filter circuitry 92, coupled to the multiplier 90, filtering the output of the multiplier 90 to remove the X2 component. The DPSK circuitry 72 further includes a bit synchronizer 94 coupled to the filter 92 for regeneration of the data clock. The DPSK circuitry 72 further includes lock detect circuitry 96 coupled to the low pass filter 92 and generating a lock detect signal. The data, clock, and lock detect signal are sent to the EPP circuitry 70.

Figure 9:
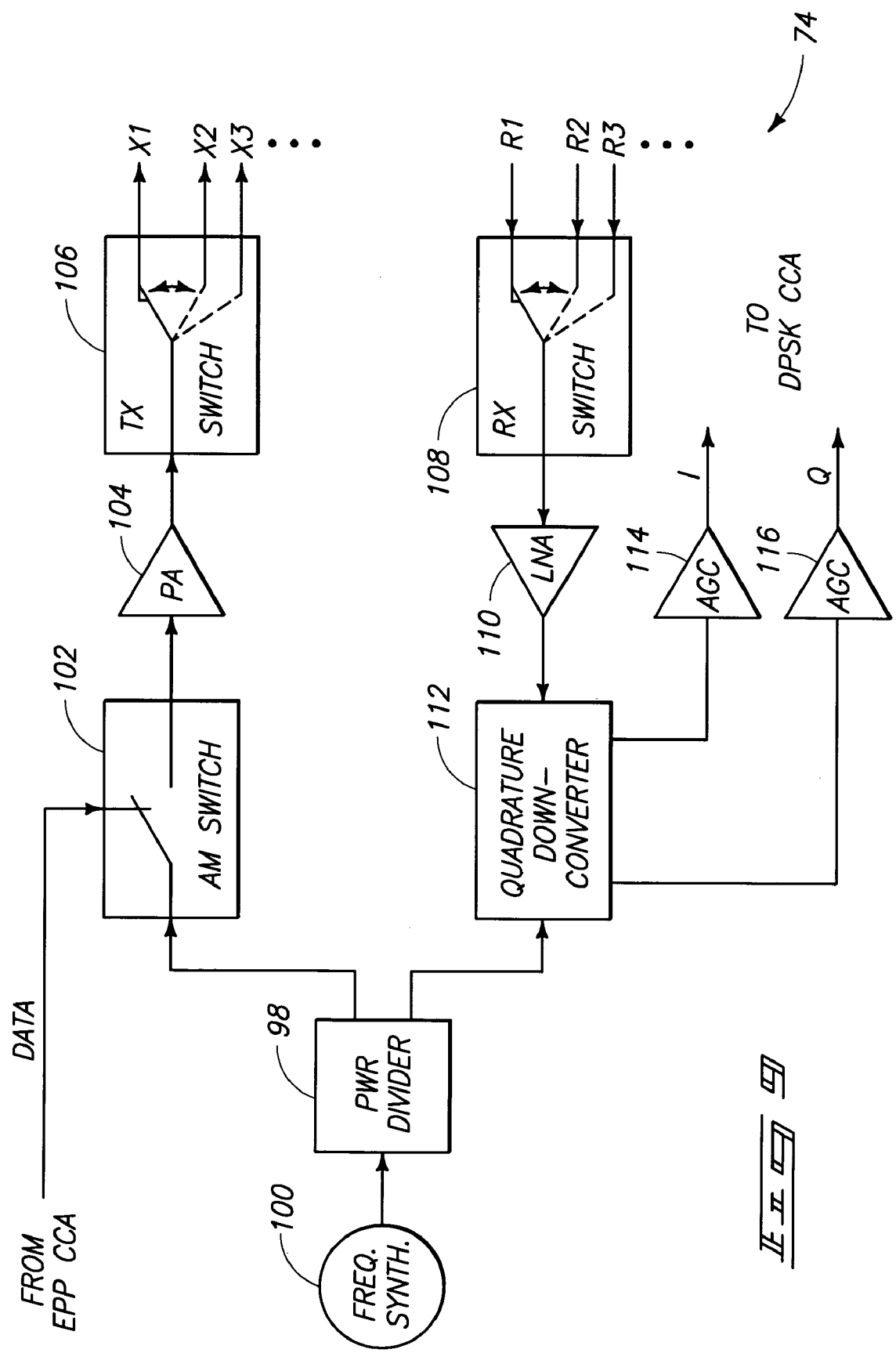
FIG. 9 is a circuit schematic of RF circuitry included in the interrogator of FIG. 7.

The RF circuitry 74 (see FIG. 9) interfaces with the transmit and receive antennas X1, X2, X3, etc., and R1, R2, R3, etc defining antennas 52. The RF circuitry modulates the data for transmission to a circuit 34, provides a continuous wave (CW) carrier for backscatter communications with a circuit 34 (if backscatter communications are employed), and receives and downconverts the signal received from the transponder unit (which is a backscatter signal in one embodiment).

The RF circuitry 74 also includes a power divider 98, and a frequency synthesizer 100 coupled to the power divider 98. The frequency synthesizer 100 tunes the RF continuous waver carrier for frequency hopping and band selection. The RF circuitry defines a transmitter, and receives data from the EPP circuitry 70. The RF circuitry 74 includes an amplitude modulation (AM) switch 102 that receives the data from the EPP circuitry 70 and amplitude modulates the data onto a carrier. More particularly, the AM switch 102 turns the RF on and off (ON OFF KEY). The RF circuitry 74 further includes a power amplifier 104, coupled to the AM switch 102, to amplify the signal. The RF circuitry 74 further includes a switch 106, coupled to the power amplifier 104, for transmission of the amplified signal through a selected one of the transmit antennas X1, X2, X3, etc.

During continuous wave (CW) transmission for the backscatter mode, the AM switch 102 is left in a closed position. When the interrogator 50 is transmitting in the CW mode, the circuit 34 backscatters the signal with a DPSK modulated sub carrier. This signal is received via one of the receive antennas R1, R2, R3, etc. More particularly, the RF circuitry 74 further includes a switch 108 coupled to the receive antennas R1, R2, R3, etc. In another alternative embodiment, such as when backscatter communications are not employed, the RF circuitry uses common antennas for both transmission and reception, and alternates use of antennas from multiple available send/receive antennas. The RF circuitry 74 further includes a low noise amplifier (LNA) 110 coupled to the switch 108 and amplifying the received signal. The RF circuitry 74 further includes a quadrature downconverter 112, coupled to the LNA 110, coherently downconverting the received signal. The RF circuitry 74 further includes automatic gain controls (AGCs) 114 and 116 coupled to the quadrature down converter 112. The amplitude of the signals are set using the automatic gain controls 114 and 116 to provide the signals I and Q. The I and Q signals, which contain the DPSK modulated sub-carrier, are passed on to the DPSK circuitry 72 (FIG. 8) for demodulation.

Although one interrogator 50 has been described, it may be desirable to provide multiple interrogators depending on the size and layout of a facility, in which case the multiple interrogators will preferably share information.

The interrogator or interrogators 50 are respectively selectively connected to the antennas 52 of an array of antennas distributed in at least the passenger areas of the facility, such as in the main terminal 14, the baggage check in area 16, the terminal concourse area 18, and the security check area 20. An interrogator connected to any of the antennas 52 has a range covering less than the area of the entire facility 10. More particularly, the more antennas 52 that are provided, the more precisely the location of an individual can be determined (the transmission and reception range of the interrogator can be decreased appropriately). Preferably, some antennas 52 are located in non-passenger areas, such as outdoor areas, to assist in locating individuals or equipment instead of passengers. The antennas 52 are designed for transmission and reception at microwave frequencies (e.g., 2.44 GHz). As described above, the antennas 52 can either comprise combined send/receive antennas, or separate antennas for sending (transmitting) and receiving. If separate antennas are used for sending and receiving, they will be referred to as a single antenna for purposes of the following discussion and claims.

Preferably, the antennas 52 are distributed fairly evenly throughout monitored areas of the facility 10. In one embodiment, an area of communication is defined by the interrogator 50 connected to an antenna 52, and the area of communication of the interrogator using one of the antennas 52 overlaps with the area of communication of the interrogator using another one of the antennas 52 so that there are no gaps in the areas of the facility desired to be covered by the system.

In operation, the interrogator 52 repeatedly transmits a wireless command to the portable wireless transponder device using alternating ones of the antennas 52. In one embodiment, the interrogator is sequentially connected to respective antennas 52, and makes at least one communication attempt using each antenna 52. The device 32 owned by an individual or supported by an object or checked or carry-on luggage transmits data identifying the device 32 (and thus the bearer or possessor of the device 32) in response to an interrogator command if the device 32 is within communications range of the antenna 52 sending the command. Thus, the individual or object is located by determining with which antenna the interrogator 50 was able to establish communications with the portable wireless transponder device.

FIGS. 12 and 13 illustrate routines executed by the controller 54 to locate individuals, equipment, or checked or carry-on baggage in the facility 10. Note that it may be useful for an airline to determine the location of checked baggage, using the system of the invention, for various reasons. For example, it may be useful to locate a piece of baggage that has been misplaced, or that is destined for a flight that is about to leave, or a piece of baggage that is in transit to a plane, but must be re-routed to a different plane. It may be useful to locate a piece of carry on baggage using the system of the invention for various reasons. For example, if a piece of carry on baggage becomes separated from its owner for a predetermined time, an assumption can be made that it is either lost or else creates a possible bomb risk that should be investigated. Also, the system can be used to locate a passenger's lost carry on or checked baggage.

The routine of FIG. 12 is continuously run (during hours of operation of the facility) and includes a step 118 of causing the interrogator to send an "identify" command, which requests that all devices 32 (within communication range) reply with their respective identification numbers. After performing step 118, the controller 54 proceeds to step 120.

In step 120, the controller 54 deletes old entries and logs identification numbers of devices 32 within the range of the antenna 52 being used. After performing step 120, the controller 54 proceeds to step 122.

In step 122, the controller switches the antenna 52 (or antenna pair) being used by the interrogator. After performing step 122, the controller 54 proceeds to step 118.

The routine of FIG. 13 is run when it is desired to locate a specific individual, item of equipment, piece of carry-on baggage, or piece of checked baggage (by inputting an identification number of a device 32).

The routine of FIG. 13 includes a step 124 of receiving (inputting) an inquiry as to the location of a particular individual. After performing step 124, the controller 54 proceeds to step 126.

In step 126, the controller determines if the individual (or item of equipment, or piece of carry-on baggage, or piece of checked baggage) is on the carrier (plane) by checking the logs for antennas at controlled access points (e.g., the gate for the flight the individual was scheduled to take). After performing step 126, the system proceeds to step 128.

In step 128, a determination is made as to whether the individual (or item of equipment, or piece of carry-on baggage, or piece of checked baggage) is on the carrier. If so, the controller proceeds to step 130. If not, the controller proceeds to step 132.

In step 130, the location of the individual (or item of equipment, or piece of carry-on baggage, or piece of checked baggage) is displayed as being on board the carrier (e.g. the airplane). After performing step 130, execution terminates.

In steps 132 and 134 (which can be combined), current (most recent) logs are read for all other antennas, and the controller searches for the particular individual (or item of equipment, or piece of carry-on baggage, or piece of checked baggage) in these logs. After performing steps 132 and 134, the controller proceeds to step 136.

In step 136, a determination is made as to whether the particular individual (or item of equipment, or piece of carry-on baggage, or piece of checked baggage) was located in any of these logs. If so, the controller proceeds to step 140. If not, the controller proceeds to step 138.

In step 138, the controller causes a display to be generated that the search failed or the individual (or item of equipment, or piece of carry-on baggage, or piece of checked baggage) was not located on the premises. After performing step 138, execution terminates.

In step 140, a determination is made as to whether the individual (or item of equipment, or piece of carry-on baggage, or piece of checked baggage) was located in more than one log (in logs associated with more than one antenna). If so, the controller proceeds to step 142. If not, the controller proceeds to step 144.

In step 142, the location is displayed of the antenna where the logged communication with the device of the particular individual (or item of equipment, or piece of carry-on baggage, or piece of checked baggage) took place. This is presumably where the individual (or item of equipment, or piece of carry-on baggage, or piece of checked baggage) is presently located. After performing step 142, execution terminates.

In step 144, because the individual has been logged in more than one antenna location, all antenna locations can be displayed or, in the illustrated embodiment, triangulation or telemetry are used, and/or relative signal strengths measured by the multiple antennas for the last logged reply by the card are used, to locate with particularity the particular individual's location (or the location of the item of equipment, or piece of carry-on baggage, or piece of checked baggage). Optionally, the direction of travel is also determined by determining change in triangulated location with respect to time. After performing step 144, the controller proceeds to step 146.

In step 146 the controller causes the location of the particular individual (or item of equipment, or piece of carry-on baggage, or piece of checked baggage) to be displayed. After performing step 146, the controller proceeds to step 148.

This system and routine can be used to track the location of equipment bearing the circuit 34, carry-on baggage bearing the equipment, or checked baggage bearing the equipment.

In one embodiment of the invention, the system 12 further comprises a carrier (e.g., airline) reservation and baggage tracking system 152 (FIG. 2). Any presently used reservation system can be employed. For example, a system such as the systems described in incorporated U.S. Pat. Nos. 5,401,944; 5,151,692; 5,051,565; 5,010,240; 4,984,156; 4,931,932; 4,449,186; 4,247,795; and 3,750,103 can be employed for the carrier reservation and baggage tracking system 152. The reservation and baggage tracking system 152 includes a computer having a database storing information identifying passengers who have purchased tickets for passage (e.g., a flight), information about scheduled departures (e.g., for flights), information identifying passengers who have checked in (e.g., for a flight), etc. The system 12 further includes a network 154 connecting the interrogator 50 to the carrier reservation and baggage tracking system 152. Any appropriate network, such as a local area network, wide area network, Intranet network, Internet network, etc. can be employed. If multiple airlines or carriers in the facility have separate reservation systems, the network 154 preferably connects all participating reservation systems to the interrogator 50.

In this embodiment, the card 32 is used to automatically check in a passenger who enters the facility or a designated area of the facility (e.g., a gate area), as desired.

More particularly, the interrogator 50 defines a wireless transponder in communication with the computer of the carrier reservation and baggage tracking system 152. The interrogator periodically sends wireless commands requesting responses from portable identification devices (e.g., the cards 32). The cards 32 transmitting identifying data (e.g., a serial number that is associated with the bearer, a Social Security Number, a frequent flyer number, a confirmation number, etc.) in response to receiving a command from the interrogator. The interrogator has a desired coverage area (e.g., in the airport, or in the gate area), and communicates only with cards 32 within the desired area. The computer of the carrier reservation and baggage tracking system 152 modifies the reservation database to indicate that a passenger has checked in, in response to the interrogator 50 receiving a response from a card 32 in the desired coverage area. Thus, the card 32 acts as an electronic boarding pass, saving the passenger from having to stand in line to check in, and reducing labor required by the carrier.

Conditions can be imposed before the electronic boarding pass is accepted. For example, in one embodiment, the electronic boarding pass (card 32) is accepted to check in a passenger only within a predetermined time period before a scheduled departure. Thus, if a passenger is in the airport the day before a flight (e.g., to greet an arriving passenger, or for an unrelated flight), the passenger is not considered to be checked in. In one embodiment, the electronic boarding pass is only accepted if the response from the card 32 includes identifying data for a passenger for whom the database in the carrier reservation and baggage tracking system 152 indicates that a ticket for a flight has been purchased. A routine for execution by the system 152 to this effect is provided in FIG. 14, and includes a first step 156 in which the system 152 retrieves a list of passengers having reservations for flights scheduled to leave in the next predetermined time period (e.g., flights scheduled to leave in the next two hours, or next one hour). After performing step 156, the system proceeds to step 158.

In step 158, a determination is made as to whether identification data (e.g., Social Security Number, frequent flier number, serial number, etc.) logged using designated antennas 52 (e.g., in the airport, or in the gate area for the particular flight, etc.) match the identification data of any passengers on the reservation list for flights scheduled to leave in the next predetermined time period. If so, the system proceeds to step 160. If not, the system proceeds to step 162.

In step 160, the system checks in the qualifying passengers (those logged using designated antennas and matching the identification data of passengers on the reservation list for flights scheduled to leave in the next predetermined time period). The system further assigns seats (this may be based on known customer preferences, such as preferences stored for frequent fliers), and moves the checked in passengers from the reservation list to the checked in list. This is so that there is no need to search for passengers who have already checked in, next time step 156 is executed. After performing step 160, the system proceeds to step 166.

In step 162, a time delay is imposed so that the system is freed up to perform other tasks. After performing step 162, the system proceeds to step 164.

In step 164, the time is updated. In other words, the system time is retrieved for purposes of defining the predetermined time period of step 156. After performing step 164, the system proceeds to step 156.

In step 166, a time delay is imposed so that the system is freed up to perform other tasks. After performing step 166, the system proceeds to step 168.

In step 168, the time is updated. In other words, the system time is retrieved for purposes of defining the predetermined time period of step 156. After performing step 168, the system proceeds to step 156.

In one embodiment, the transponder device 32 is manufactured using techniques such as those described in a commonly assigned U.S. patent application titled "Tamper Resistant Smart Card and Method of Protecting Data In a Smart Card", filed Feb. 13, 1997, listing as inventor John R. Tuttle et al., now U.S. Pat. No. 5,988,510, and incorporated herein by reference. In one embodiment, the device 32 includes a magnetic stripe which the carrier (e.g., airline) can use for various purposes instead of or in addition to using the antennas 52. For example, an airline may use the antennas 52 to check in a passenger, but may use the magnetic stripe with a card reader at a gate 22 (such as the card reader described in U.S. Pat. No. 5,010,240) in place of a boarding card when a passenger passes through the gate 22 to board a plane, or vice versa.

In one embodiment, the system gives an indication to a passenger that the passenger has been successfully checked in, such as by displaying a message on a monitor, on a display on the card 32 (described elsewhere herein), by making an announcement on a speaker, or by other means.

In one embodiment, a similar method and routine is used to check in luggage bearing a card 32 (or a miniature tag housing the integrated circuit 34) which is configured to transmit data indicating the card is associated with checked baggage (instead of carry-on baggage or other equipment) in response to a command from the interrogator. The luggage can be checked in instead of or, preferably, in addition to the passenger. This way, the passenger can just leave the luggage in a designated area instead of waiting in a line. Airline personnel can determine the destination by interrogating the card 32 or tag on the baggage. Thus, the card 32 or tag becomes an electronic (recyclable) baggage tag. In one embodiment, the card 32 or tag on the checked baggage includes a display (as described elsewhere herein), which displays the destination of the baggage (and/or transfer points).

In one embodiment of the invention (see FIGS. 1-3), the system 12 communicates custom travel (e.g. flight) information to a passenger. The system 12 uses the computer of the previously described carrier reservation and baggage tracking system 152. The system further includes monitors 170 and/or speakers 172, and appropriate converters 174 and 176 connecting the monitors and speakers to the network. The converters 174, for example, may convert from EGA, VGA, or super VGA to a standard television signal, and the converters 176, for example, may be sound cards or equivalent circuitry. Whenever a passenger is in proximity to an antenna located near a monitor or speaker, the interrogator 50 determines this in the same way that the interrogator 50 locates passengers, by communicating with a card 32 possessed by the passenger. The system accesses the reservation and baggage tracking system 152, retrieves the departure information for that passenger, and displays the information on the monitor as shown in FIG. 3. More particularly, the system uses the existing reservation database of the system 152, including information identifying passengers who have purchased tickets for a flight, and information about scheduled departures. The information includes existing information such as a flight, bus or train number 178, destination 180, a gate, bay, or track number 182, scheduled departure time 184, and status information 186 (e.g., boarding, on time, delayed, gate change, see agent, cancelled, etc.).

If multiple passengers are in communications range of the antenna near the monitor 170, information will appear tailored for each of these passengers, as shown in FIG. 3. The information displayed therefore preferably includes the passenger's name 188 (or an identifying code or number known by the passenger), as well. The information may be sorted (arranged) by passenger name in alphabetical order, by scheduled departure time, or by order of detection of the passengers by the interrogator 50.

Figure 10:
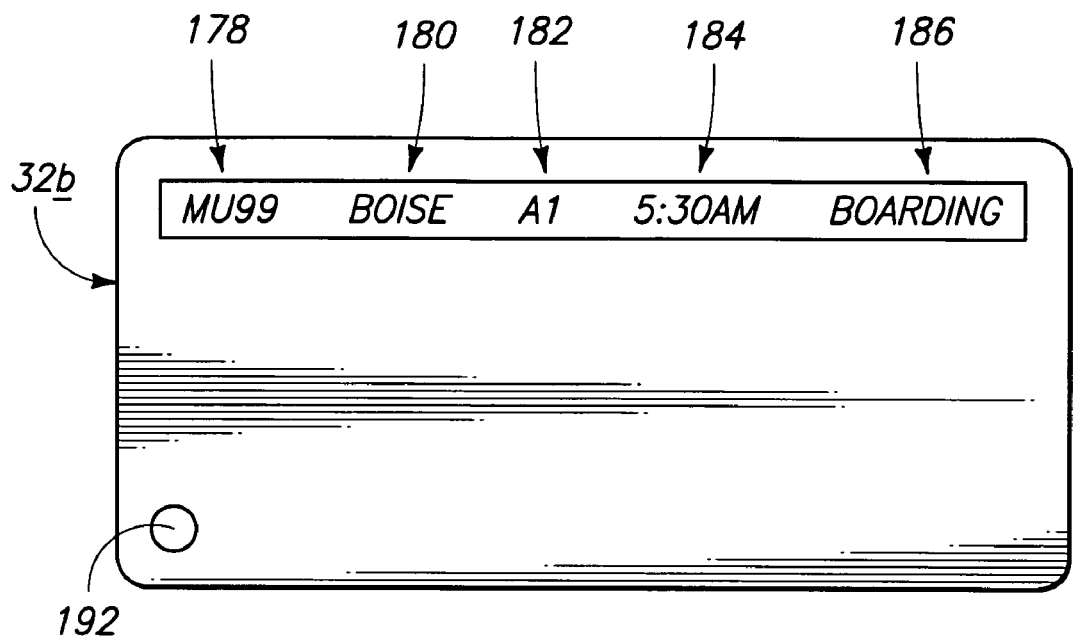
FIG. 10 is a plan view of a card in accordance with an alternative embodiment of the invention.
Figure 11:
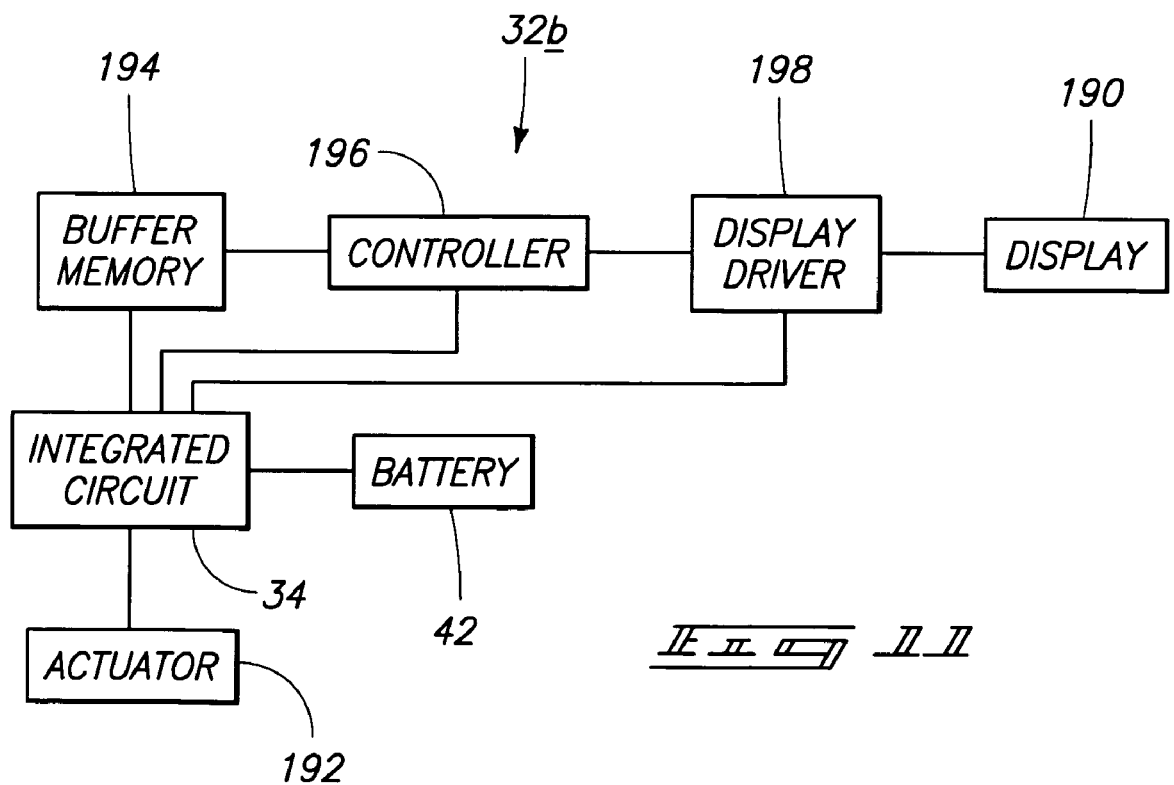
FIG. 11 is a block diagram illustrating assembly of the card of FIG. 10.

In one embodiment, shown in FIGS. 10 and 11, an alternative card 32B is provided which is similar to the card 32, but further includes a display 190 coupled to the integrated circuit 34. The display 190 can be a liquid crystal display, LED display, or other type of display. In this embodiment, the customized information for the passenger bearing the card 32B appears on the display 190. The display 190 can be activated by bringing the card 32B in communication range with a designated antenna 52 in the facility (which may be arranged to have a small range requiring close proximity, so the display is not continuously activated while the passenger travels through the facility). Alternatively, the card 32B is further include an actuator 192 coupled to the integrated circuit 34, actuation of which causes display of the information. The information can be similar to the information displayed on the monitor 170, if a monitor 170 is used, except that the name of the passenger may be omitted because the bearer of the card 32B is obviously the passenger. On the other hand, it may be desirable to display the passenger name to avoid mistaken swapping of the cards 32B or to avoid theft. The actuator 192 may be connected to an analog or digital input pin of the integrated circuit.

In the embodiment of FIGS. 10 and 11, the card further includes a buffer memory 194 coupled to a serial input/output port of the integrated circuit 34, a controller 196, and a display driver 198. The serial input output port is used to load the buffer memory 194, and then the controller 196 and display driver 198 drive the display 190.

Although the system of the invention has been described in connection with an airport and airline reservation system, it will be apparent that the system also has application to other travel depots and reservation systems, for those traveling by train, boat, bus, etc.

In one embodiment, systems of multiple facilities (airports) are connected together, such as by using a telephone link, wide area network, Internet, Intranet, etc., so that data can be shared among various systems. In this embodiment, the location of checked luggage, carry-on luggage, equipment, or individuals can be determined if the location is within communications range of an interrogator in any of the connected facilities (airports).

Various other applications for the system 10 will readily be apparent to those of ordinary skill in the art.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A reservation system comprising:
   a database configured to store information identifying customers who have purchased tickets for an event, information about the scheduled time for the event, and information identifying customers who have arrived;
   a controller configured to operate on the database; and
   an interrogator in communication with the controller, and an antenna coupled to the interrogator, the interrogator being configured to send wireless commands requesting wireless responses from portable identification devices, the portable identification devices being configured to transmit identifying data in response to receiving a command, the interrogator having a predetermined communications range and being configured to communicate with portable identification devices within the predetermined communications range, the controller being configured to modify the database to indicate that one of the customers who purchased a ticket has arrived, responsive to the interrogator receiving a response from the portable identification device associated with that customer, which response includes identifying data for that customer.

2. The system of claim 1, further comprising at least one of the portable identification devices, including a housing, a battery, a transponder, and a microprocessor in the housing.

3. The system of claim 1, further comprising at least one of the portable identification devices, including an integrated circuit having a transponder, a microprocessor, and a memory, and being configured to communicate with the interrogator at a microwave frequency.

4. A travel reservation system comprising:
   a computer configured to operate on a database having information identifying passengers who have made travel reservations, information about the scheduled departure, and information identifying passengers who have checked in;
   an interrogator in communication with the computer, and an antenna coupled to the interrogator, the interrogator being configured to send wireless commands requesting wireless responses from portable identification devices, the portable identification devices being configured to transmit identifying data in response to receiving a command, the interrogator having a predetermined communications range and being configured to communicate with portable identification devices within the predetermined communications range, the computer being configured to modify the database to indicate that one of the passengers who made travel reservations has checked in, responsive to the interrogator receiving a response from the portable identification device associated with that passenger, which response includes identifying data for that passenger; and
   a second antenna selectively alternately connected to the interrogator and configured to communicate with portable identification devices that have passed to a predetermined area indicating that a passenger has boarded a vessel, the computer being configured to modify the database to indicate that a passenger has boarded the vessel, in response to a portable identification device identifying a passenger communicating with the interrogator from the predetermined area.

5. The system of claim 4, further comprising at least one of the portable identification devices, including a housing, a battery, a transponder, and a microprocessor in the housing.

6. The system of claim 4, further comprising at least one of the portable identification devices, including an integrated circuit having a transponder, a microprocessor, and a memory, and being configured to communicate with the interrogator at a microwave frequency.

7. A system for communicating scheduling information to a customer,
   the system comprising:
   a computer configured to operate on a database having information identifying customers who have purchased tickets, information identifying customers who have arrived, and information about scheduled event times;
   a monitor coupled to the computer; and
   an interrogator in communication with the computer and configured to send wireless commands requesting wireless responses from portable identification devices, the portable identification devices being configured to transmit identifying data in response to receiving a command, the interrogator having a range selected for communicating with portable identification devices proximate the monitor, the computer being programmed to cause information about a customer's event to be automatically displayed on the monitor in response to the portable identification device coming within the selected range and communicating wirelessly with the interrogator, the information including an indication of whether or not the customer's arrival has been noted.

8. The system of claim 7, wherein the information displayed on the monitor includes the customer's name.

9. The system of claim 7, wherein the information displayed on the monitor includes a code identifying the customer.

10. A system for communicating travel information to a passenger, the system comprising:
    a computer configured to operate on a database having information identifying passengers who have purchased tickets, information identifying passengers who are checked in, and information about scheduled departures;
    a monitor coupled to the computer; and
    an interrogator in communication with the computer and configured to send wireless commands requesting wireless responses from portable identification devices, the portable identification devices being configured to transmit identifying data in response to receiving a command, the interrogator having a predetermined range for communicating only with portable identification devices within a desired distance from the monitor, the computer being programmed to cause information about a passenger's departure to be automatically displayed on the monitor in response to any of the portable identification devices coming within the range;

wherein if multiple passengers having portable identification devices are within the range, the computer causes the monitor to show information for all of the passengers who are within the range.

11. The system of claim 10, wherein the information for a passenger is shown adjacent the passenger's name.

12. The system of claim 11, wherein, if multiple passengers having portable identification devices are within the range, the information is sorted by passenger name.

13. The system of claim 10, wherein the information for a passenger is shown adjacent a code identifying the passenger.

14. The system of claim 10, further comprising at least one of the portable identification devices, wherein the portable identification device includes an actuator, and wherein the travel information is shown on the display in response to the actuator being actuated.

15. A system, comprising:
a computer system configured to access a database storing information identifying passengers who have purchased tickets for an airline flight, schedule information for the airline flight, and arrival information of the passengers of the airline flight;
wherein the computer system is configured to operate on the database and to communicate with an interrogator coupled with an antenna, the interrogator to send wireless commands requesting wireless responses from portable identification devices affixed to baggage of passengers checking in for the airline flight, each of the portable identification devices being configured to transmit identifying data in response to receiving a wireless command, the interrogator having a predetermined communications range and being configured to communicate with portable identification devices within the predetermined communications range, the computer system configured to modify the database to indicate that a passenger of the airline flight who purchased a ticket has arrived, responsive to the interrogator receiving a response from a portable identification device associated with the passenger, the response including identifying data for the passenger.

16. The system of claim 15, wherein the response from the portable identification device includes a frequent flyer number of the passenger.

17. The system of claim 15, wherein the database stores check in information for passengers and their baggage.

18. The system of claim 15, wherein the computer system modifies the database to indicate check in of the passenger after receipt of the response from the portable identification device.

19. The system of claim 15, wherein arrival of the passenger includes check in of the passenger for the airline flight.

20. The system of claim 15, wherein each of the portable identification devices within the predetermined communications range includes a housing, a transponder, a microprocessor and a memory.

21. The system of claim 15, wherein the wireless commands are sent at a microwave frequency.

22. A method comprising:
providing a computer system configured to access a database storing customer information for an event, schedule information for the event, and customer arrival information for the event;
an interrogator, coupled with an antenna, communicating with the computer system, the interrogator to send wireless commands requesting wireless responses from portable identification devices, each of the portable identification devices to transmit identifying data in response to receiving a wireless command, the interrogator having a predetermined communications range and to communicate with portable identification devices within the predetermined communications range; and
modifying, via the computer system, the database to indicate that a customer of the event has arrived, responsive to the interrogator receiving a response from a portable identification device associated with the customer, which response includes identifying data for the customer.

23. The method of claim 22, wherein the customer information for the event comprises information identifying customers who have purchased tickets for the event.

24. The method of claim 22, wherein arrival of the customer includes check in of the customer for a flight.

25. The method of claim 22, wherein each of the portable identification devices within the predetermined communications range includes a housing, a transponder, a microprocessor and a memory; and the wireless commands are sent at a microwave frequency.

26. A system comprising:
a computer system configured to access a database storing passenger information for an airline flight and passenger check in information for the airline flight, the computer system configured to operate on the database; and
an interrogator in communication with the computer system, and an antenna coupled to the interrogator, the interrogator being configured to send a wireless command requesting a wireless response from a portable identification device secured to baggage of a passenger, the portable identification device being configured to transmit identifying data of the passenger in response to receiving the command, the interrogator having a predetermined communications range and being configured to communicate with portable identification devices within the predetermined communications range, the computer system being configured to modify the database to indicate check in of the passenger, responsive to the interrogator receiving the response from the portable identification device, the response including the identifying data of the passenger.

27. The system of claim 26, further comprising at least one of the portable identification devices including a housing, a battery, a transponder, and a microprocessor in the housing.

28. The system of claim 26, further comprising at least one of the portable identification devices including an integrated circuit having a transponder, a microprocessor, and a memory, and being configured to communicate with the interrogator at a microwave frequency.

29. The system of claim 26, wherein the response includes a frequent flyer number.

30. The system of claim 26, wherein check in of the passenger occurs after receipt of the response from the portable identification device.

31. The system of with claim 26, wherein the portable identification device transmits the response after the baggage enters a predetermined location of an airport for check in.

32. The system of claim 26, wherein the computer system modifies the database to indicate check in of the passenger after receipt by the interrogator of the response from the portable identification device.

33. The system of claim 26, wherein the computer system causes display of an indication of check in of the passenger.

34. The system of claim 26, wherein the portable identification device communicates during check in of the passenger.

35. The system of claim 26, wherein the database stores information concerning location of the baggage.

36. The system of claim 26, wherein the database stores information indicating that the baggage is located on an airplane associated with the airline flight.

37. The system of claim 36, wherein the computer system identifies a risk when the passenger is separated from the baggage.

38. The system of claim 36, wherein the computer system identifies a risk when the passenger is separated from the baggage for a predetermined time.

39. The system of claim 26, wherein the baggage is checked baggage.

40. The system of claim 26, further comprising a second antenna, coupled to the interrogator, wherein the computer system determines the location of the baggage of the passenger based upon which antenna receives the response.

41. A method comprising:
providing access to a computer system configured to access a database storing passenger information for an airline flight and passenger check in information for the airline flight;
communicating, via an interrogator, with the computer system, the interrogator, coupled to an antenna, to send a wireless command requesting a wireless response from a portable identification device secured to baggage of a passenger, the portable identification device to transmit identifying information of the passenger in response to receiving the wireless command, the interrogator having a predetermined communications range and to communicate with portable identification devices within the predetermined communications range; and
modifying, via the computer system, the database to indicate that the passenger has checked in, responsive to the interrogator receiving the response from the portable identification device, wherein the response includes the identifying information of the passenger.

42. The method of claim 41, wherein the identifying information of the passenger includes a confirmation number.

43. The method of claim 41, wherein the identifying information of the passenger includes a frequent flyer number.

44. The method of claim 41, wherein each of the portable identification devices includes a housing, a transponder, a microprocessor, and a memory; and the wireless commands are sent at a microwave frequency.

45. The method of claim 41, wherein the communicating, via an interrogator, comprises receiving the response from the portable identification device after the baggage enters a predetermined location of an airport.

46. The method of claim 45, wherein the predetermined location of the airport is in an airport terminal.

47. The method of claim 41, further comprising checking in the passenger after receiving the response from the portable identification device.

48. The method of claim 41, wherein the communicating, via an interrogator, comprises the interrogator sending the wireless command requesting the wireless response from the portable identification device after the baggage has entered a predetermined location of an airport.

49. The method of claim 41, wherein receipt of the response by the interrogator from the portable identification device relates to check in of the passenger.

50. The method of claim 41, further comprising causing display of an indication that the passenger has checked in.

51. The method of claim 41, wherein the database stores information concerning location of the baggage.

52. The method of claim 41, wherein the database stores information indicating that the baggage is located on an airplane associated with the airline flight.

53. The method of claim 52, further comprising the computer system identifying a risk when the passenger is separated from the baggage.

54. The method of claim 52, further comprising the computer system identifying a risk when the passenger is separated from the baggage for a predetermined time.

55. The method of claim 41, wherein the baggage is checked baggage.

56. The method of claim 41, further comprising providing a second antenna coupled to the interrogator, and the computer system determining the location of the baggage of the passenger based upon which antenna receives the response.

* * * * *

UNITED STATES PATENT AND TRADEMARK OFFICE
CERTIFICATE OF CORRECTION

| | | |
|---|---|---|
| PATENT NO. | : 7,570,151 B2 | Page 1 of 1 |
| APPLICATION NO. | : 11/271935 | |
| DATED | : August 4, 2009 | |
| INVENTOR(S) | : John R. Tuttle | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 656 days.

Signed and Sealed this

Seventh Day of September, 2010

David J. Kappos
*Director of the United States Patent and Trademark Office*